March 31, 1970  W. V. MARBACH ET AL  3,503,093
APPARATUS FOR PRODUCING SHIRRED FOOD CASINGS
Filed Aug. 18, 1967  17 Sheets-Sheet 1

INVENTORS.
Walter V. Marbach
Victor K. Naudzius
Edward S. Sherman
BY John F. Hohmann
ATTORNEY

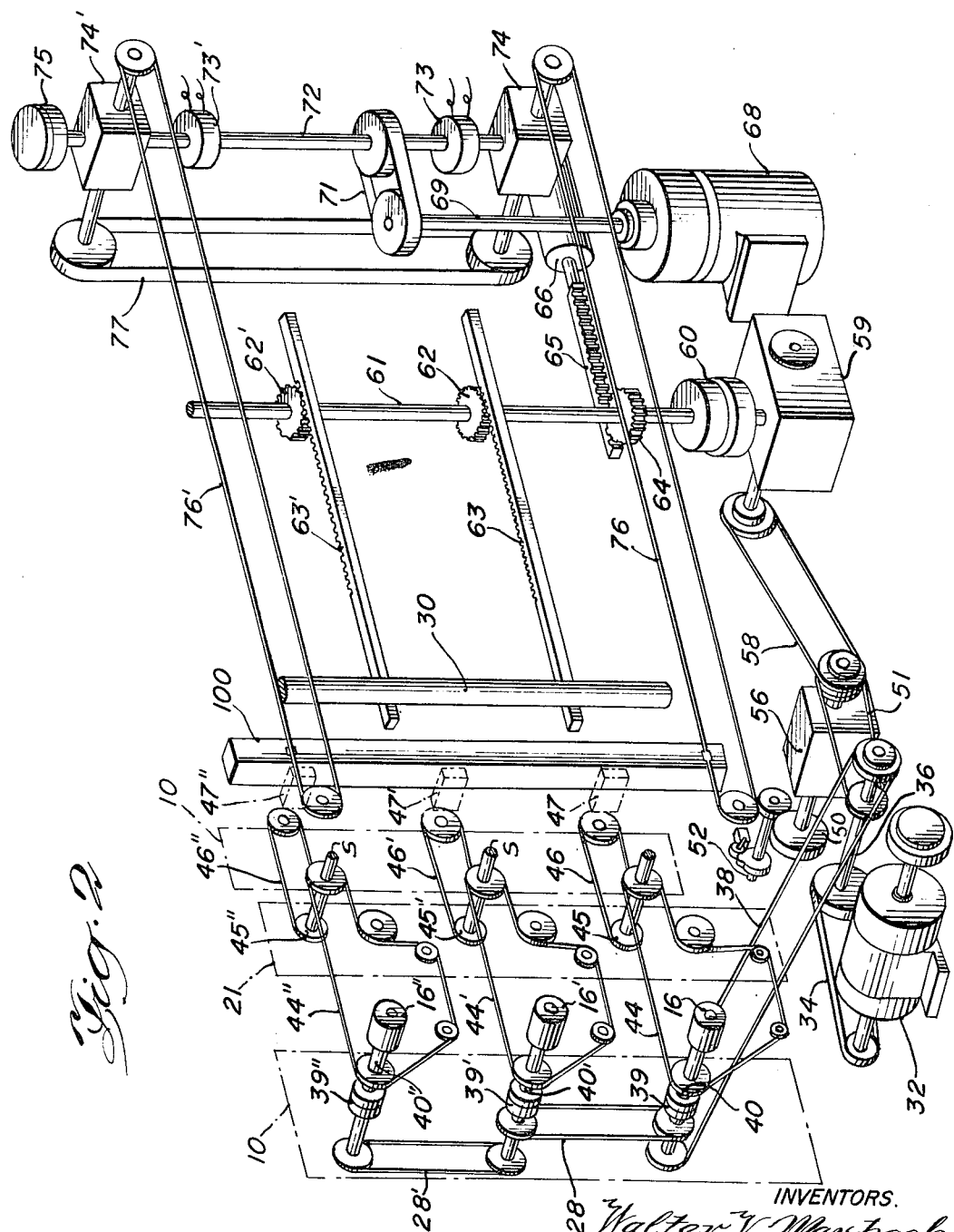

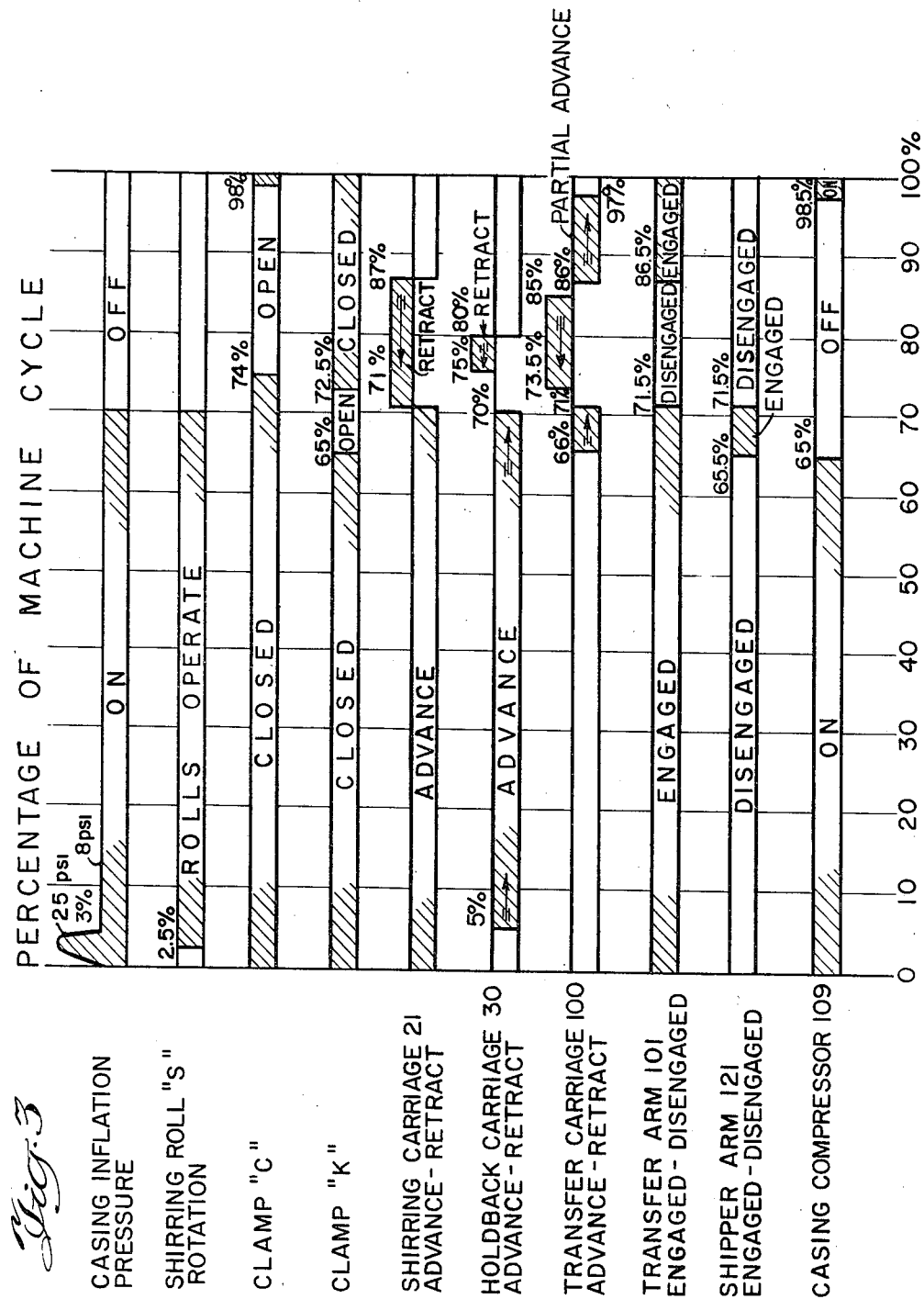

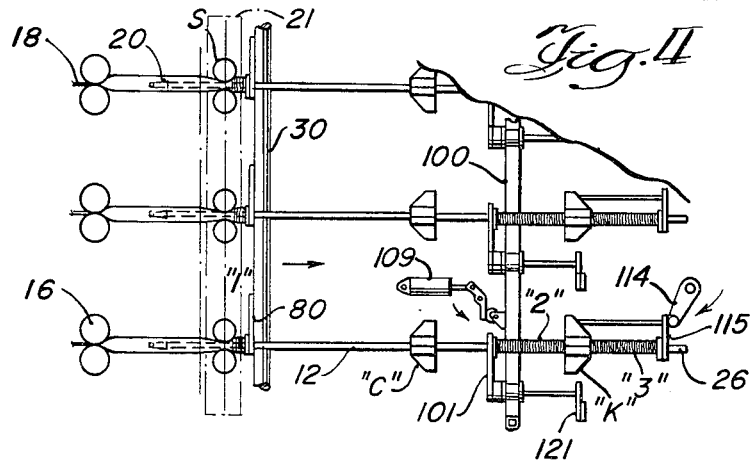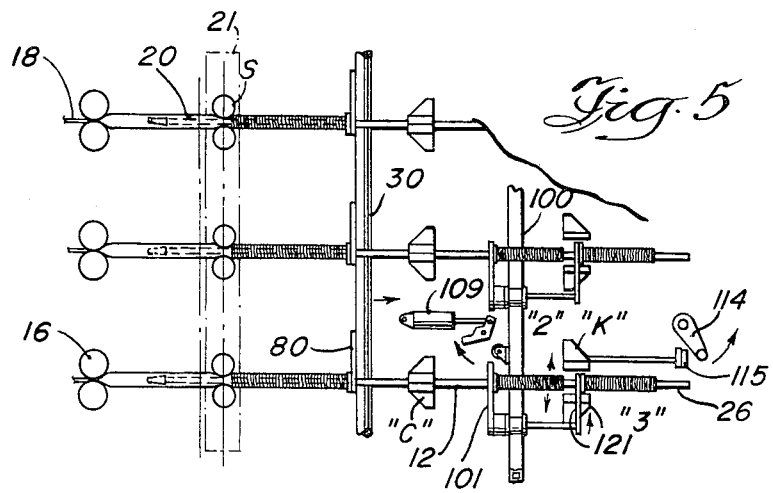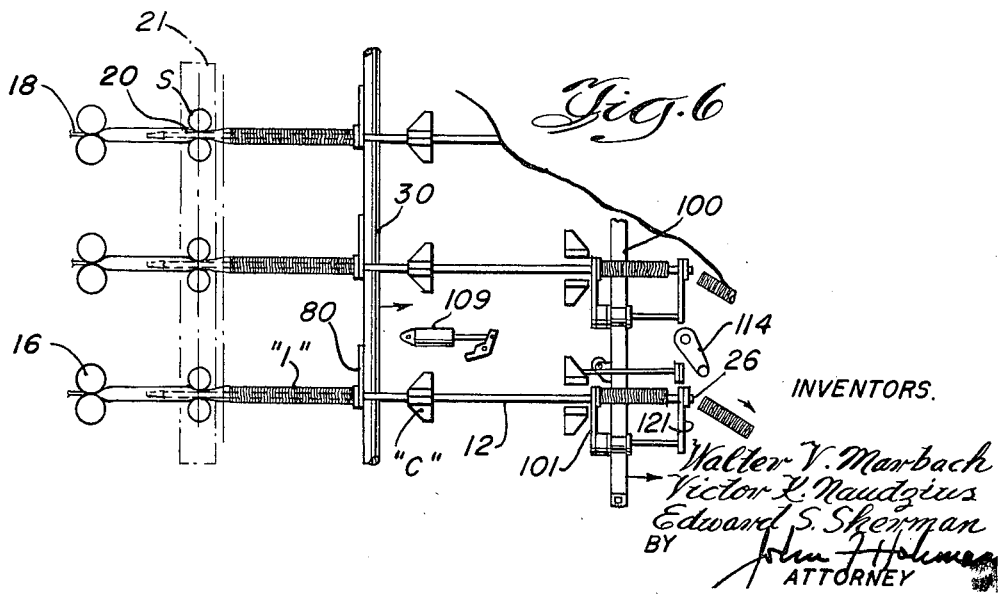

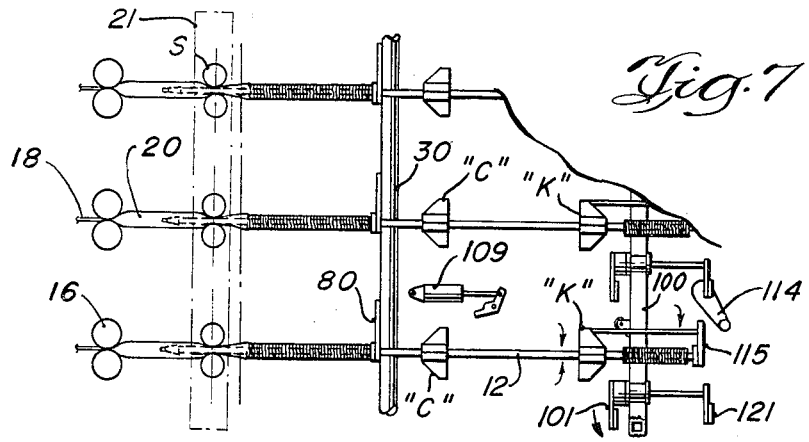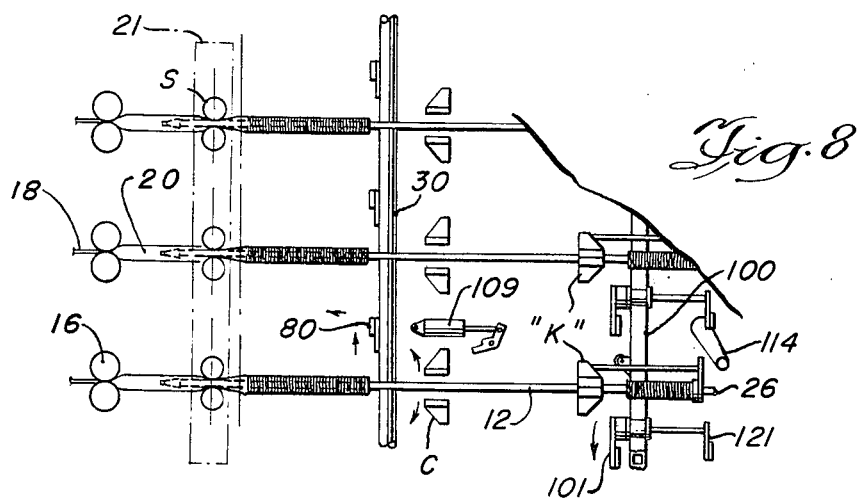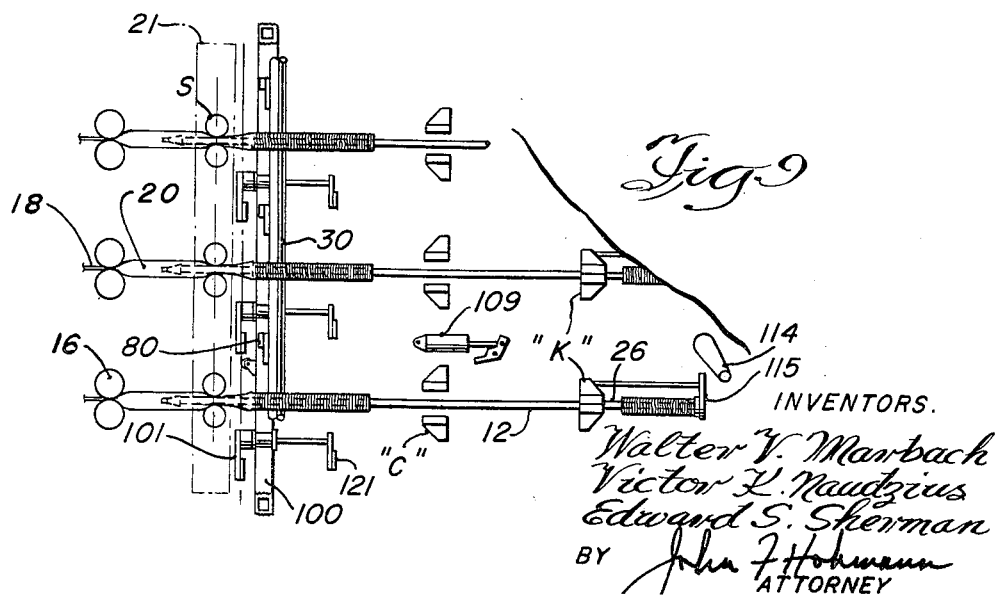

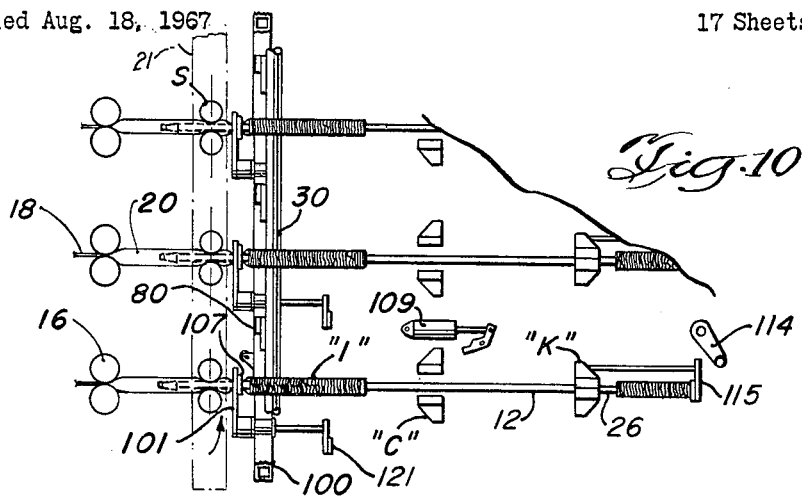
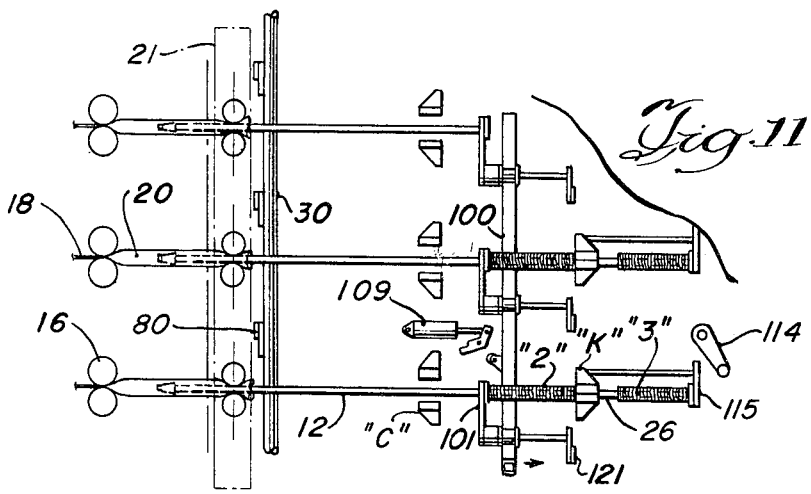
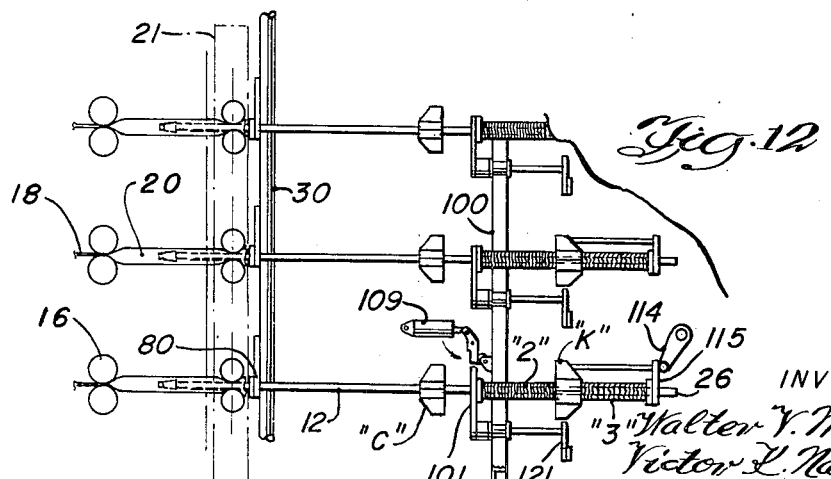

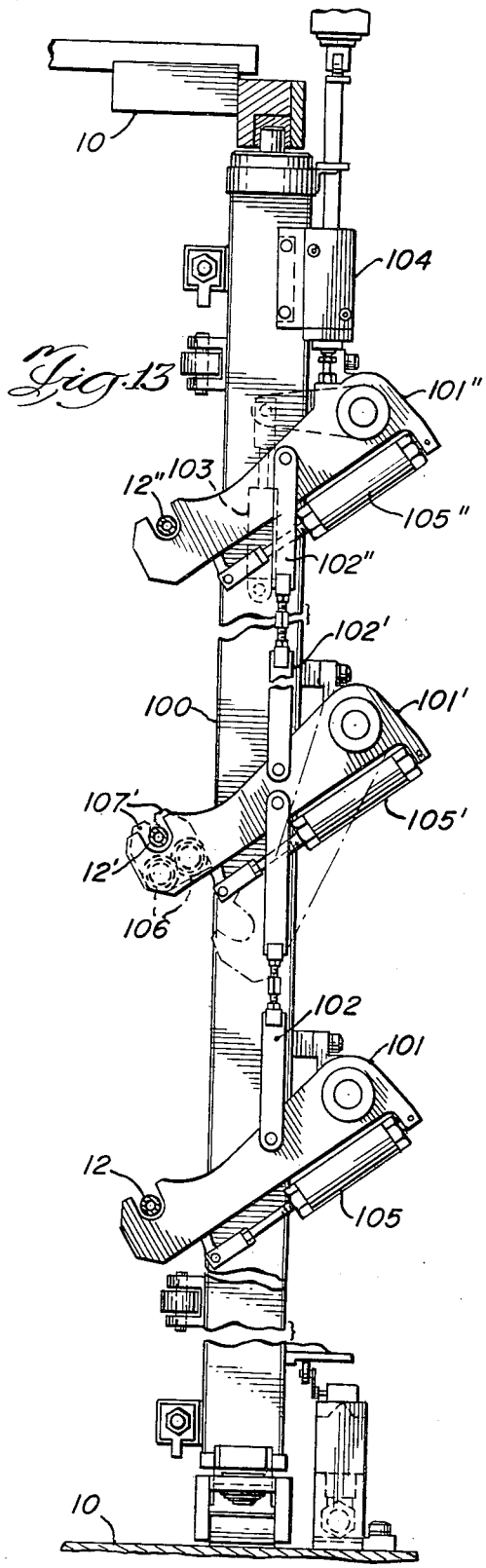
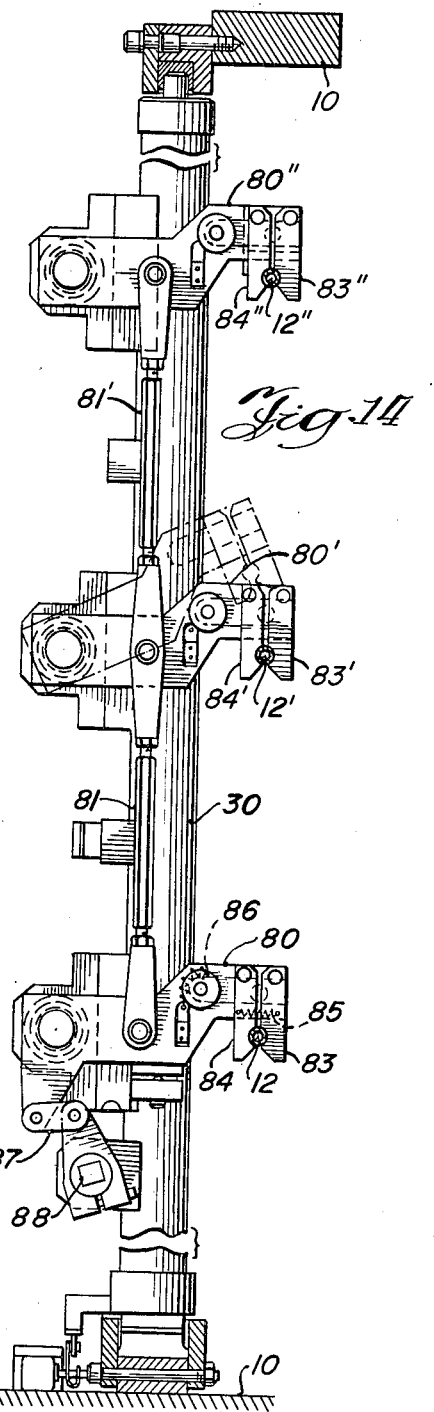

March 31, 1970     W. V. MARBACH ET AL     3,503,093

APPARATUS FOR PRODUCING SHIRRED FOOD CASINGS

Filed Aug. 18, 1967     17 Sheets-Sheet 8

INVENTORS.
Walter V. Marbach
Victor K. Naudzius
Edward S. Sherman
BY
John F. Hohmann
ATTORNEY

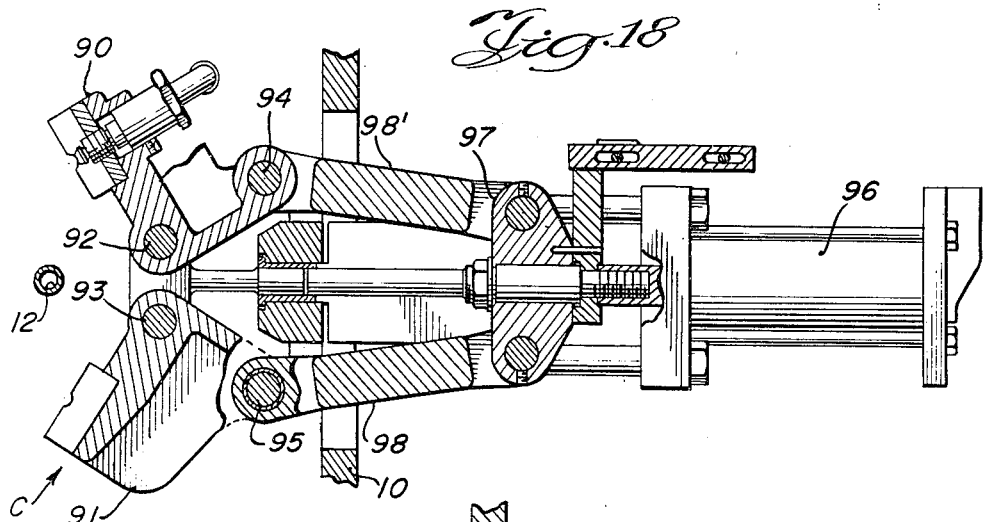
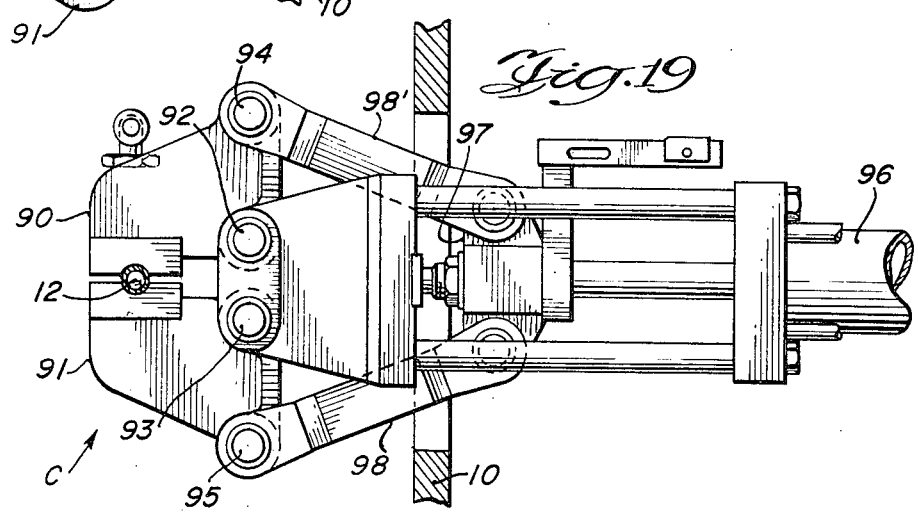
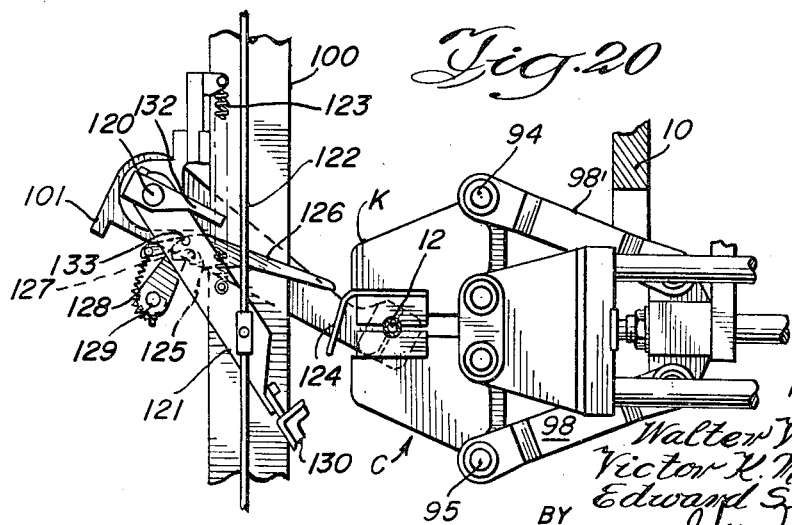

March 31, 1970   W. V. MARBACH ET AL   3,503,093
APPARATUS FOR PRODUCING SHIRRED FOOD CASINGS
Filed Aug. 18, 1967   17 Sheets-Sheet 10
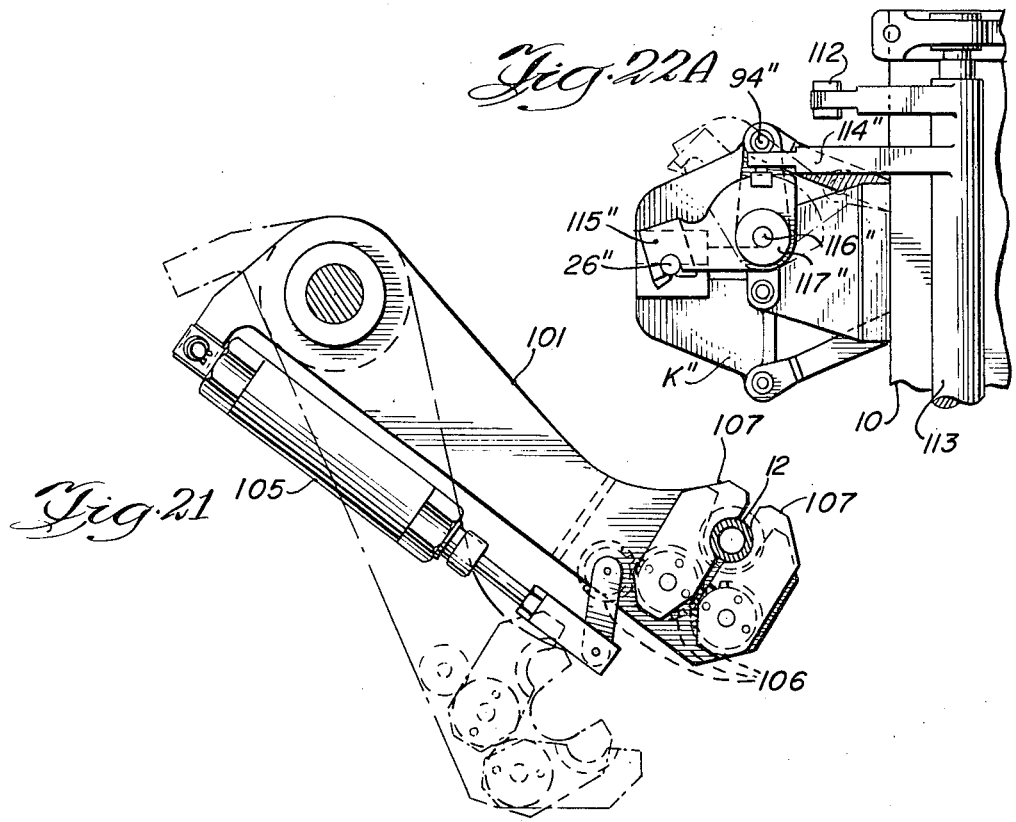
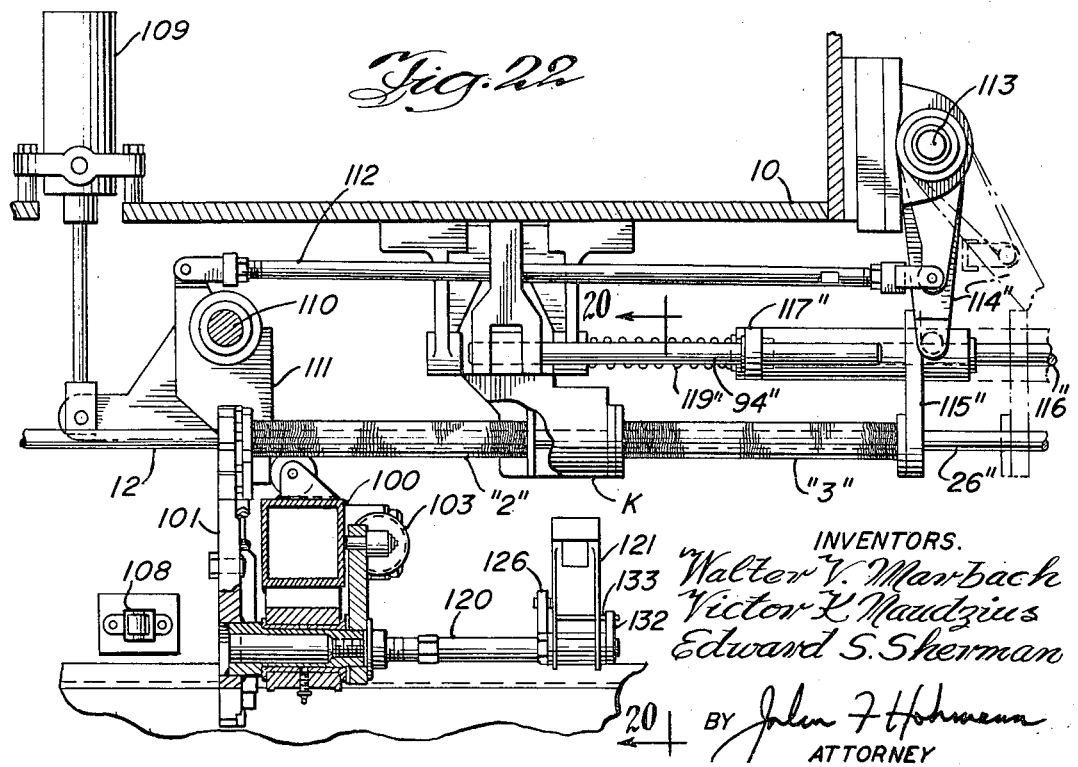
INVENTORS.
Walter V. Marbach
Victor K. Naudzius
Edward S. Sherman
BY John F. Hohmann
ATTORNEY

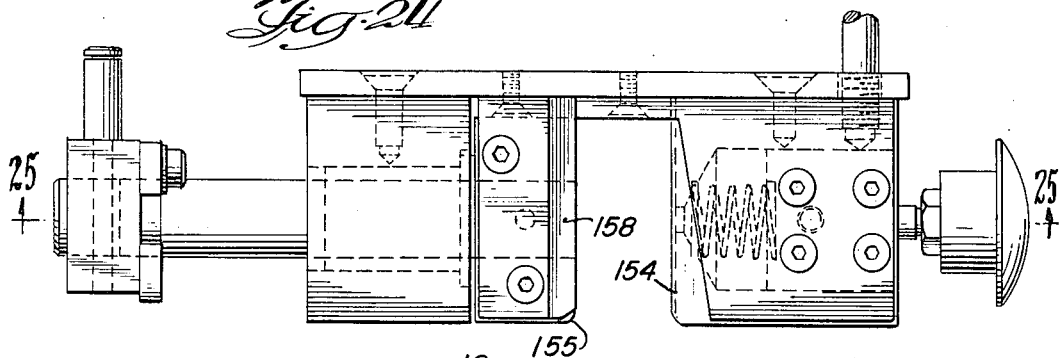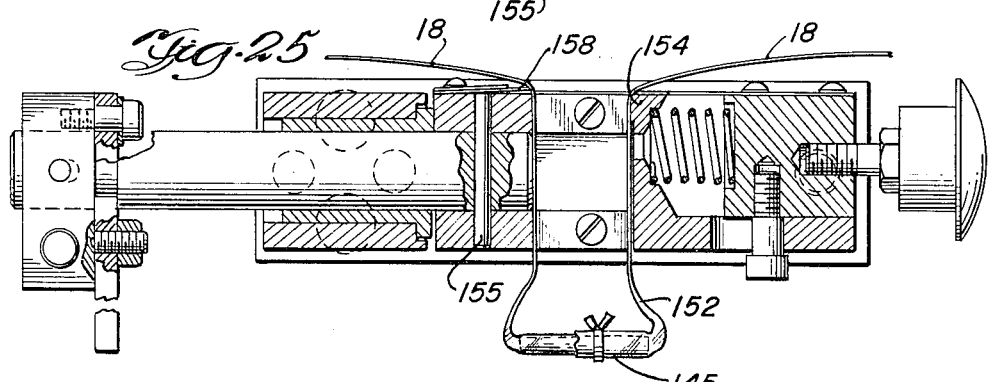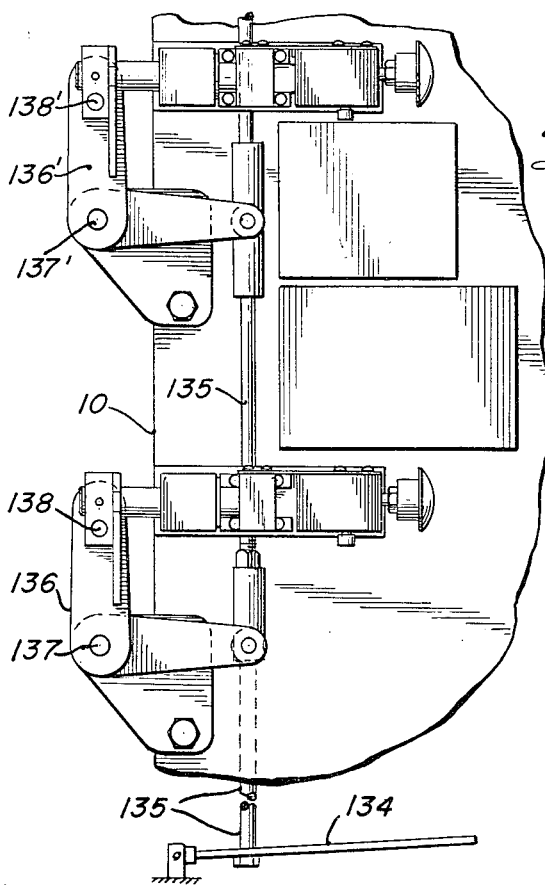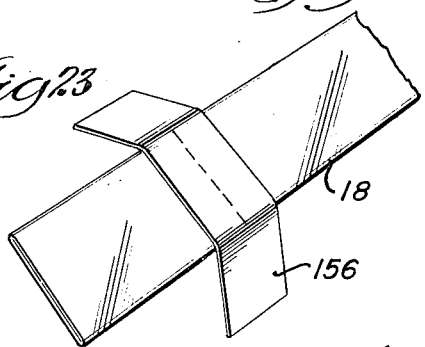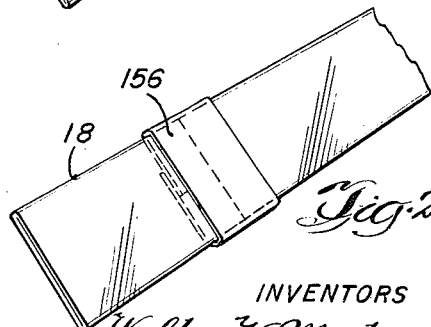

March 31, 1970 W. V. MARBACH ET AL 3,503,093
APPARATUS FOR PRODUCING SHIRRED FOOD CASINGS
Filed Aug. 18, 1967 17 Sheets-Sheet 12

INVENTORS.
Walter V. Marbach
Victor K. Naudzius
Edward S. Sherman
BY: John F. Hohmann
ATTORNEY March 31, 1970 W. V. MARBACH ET AL 3,503,093
APPARATUS FOR PRODUCING SHIRRED FOOD CASINGS
Filed Aug. 18, 1967 17 Sheets-Sheet 13
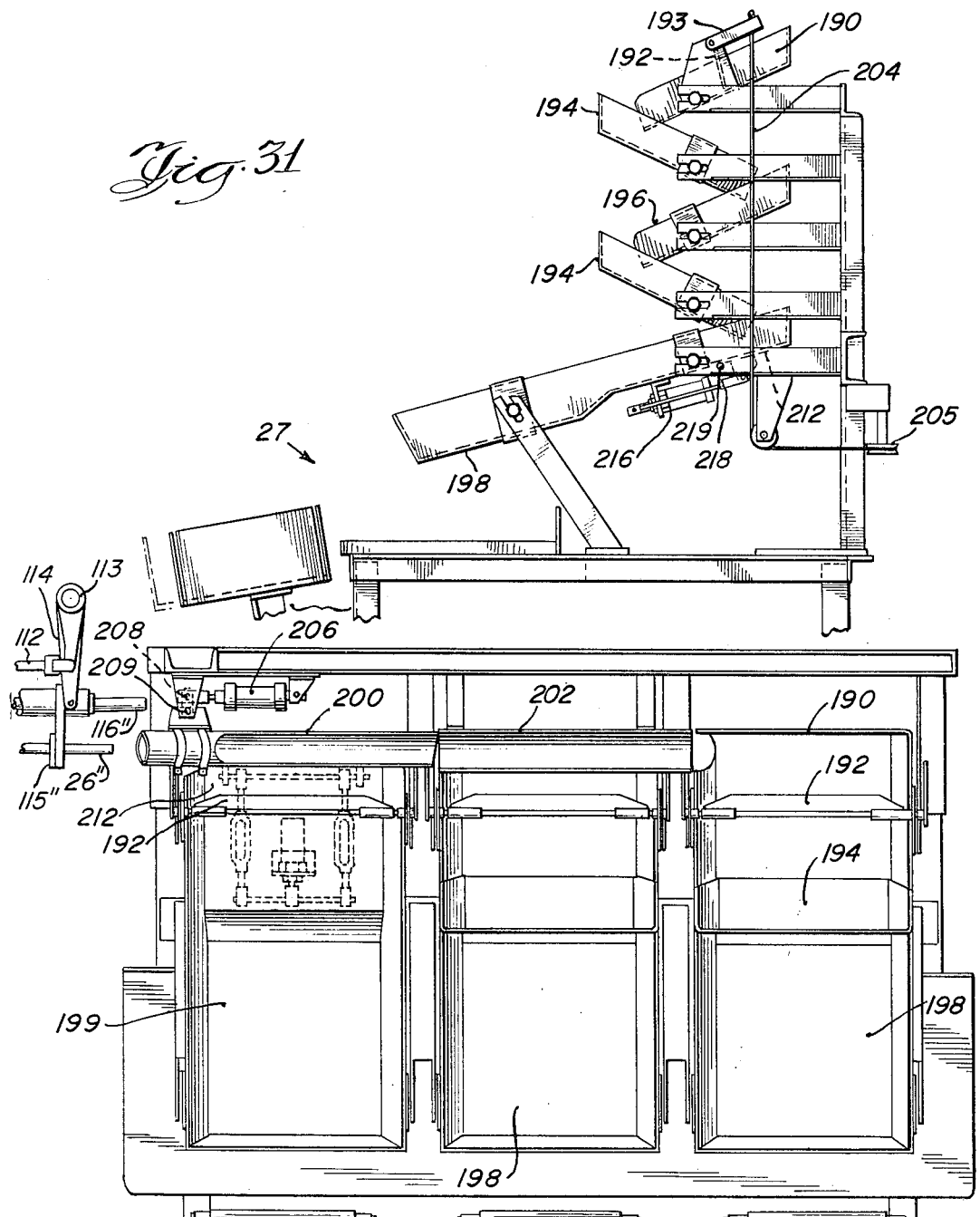
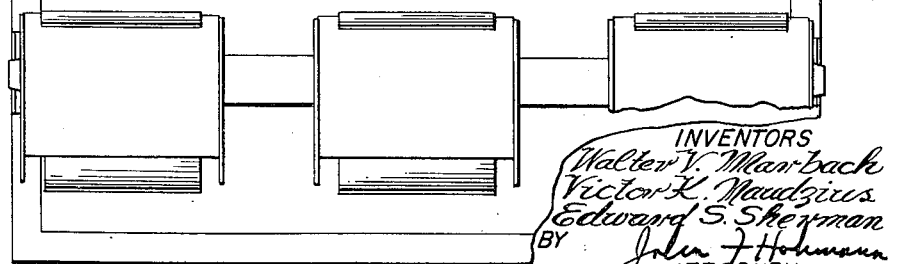

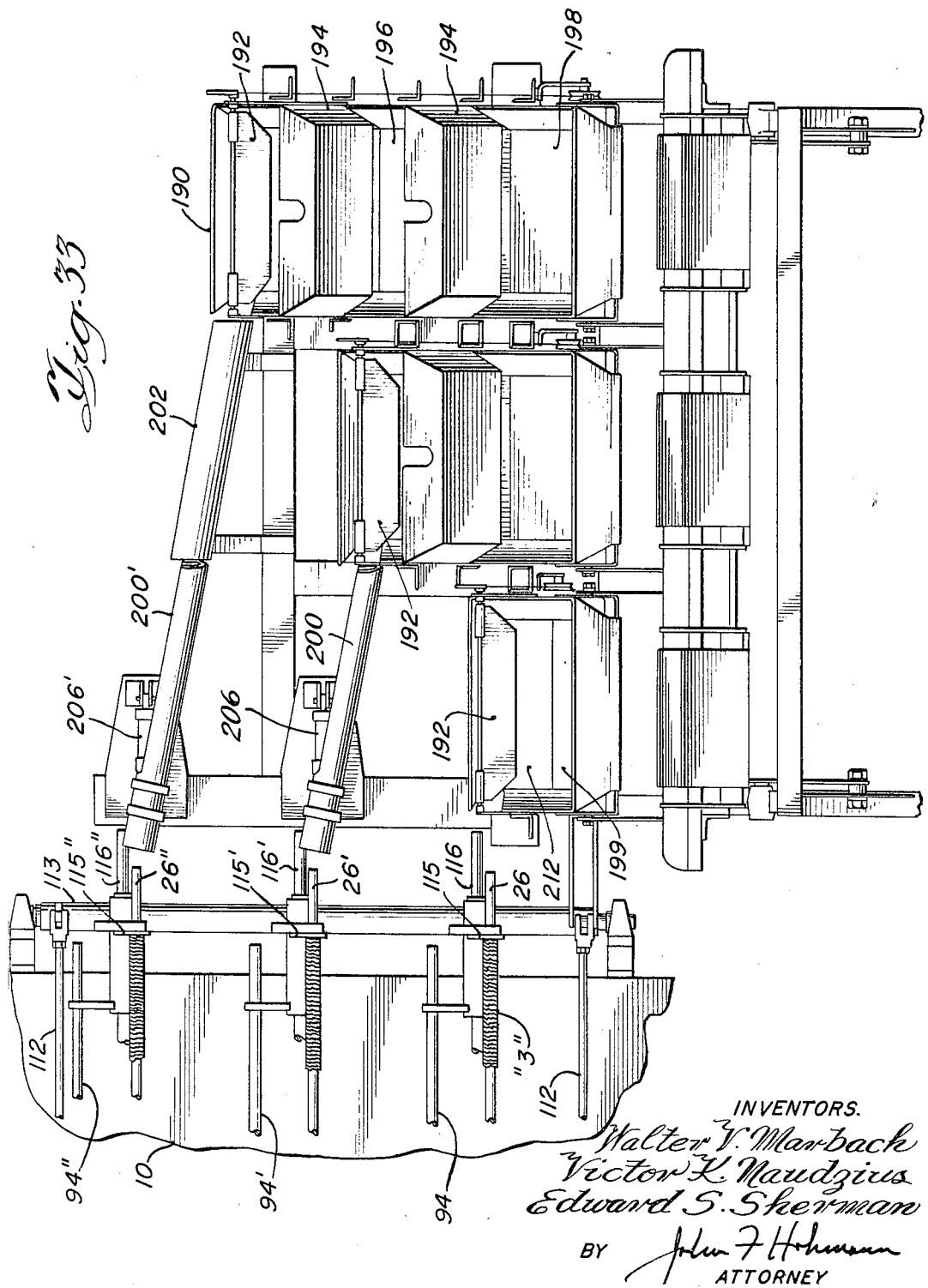

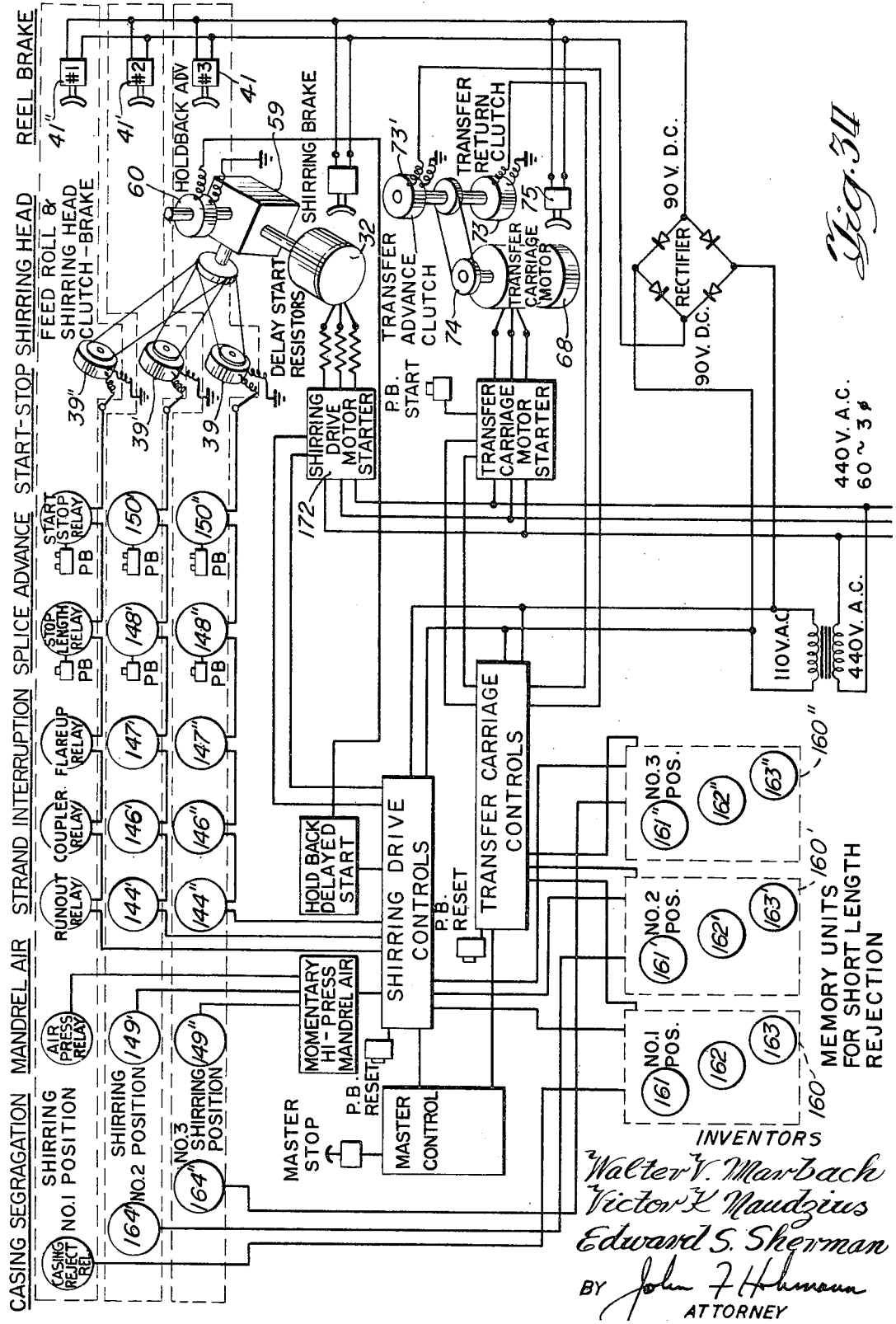

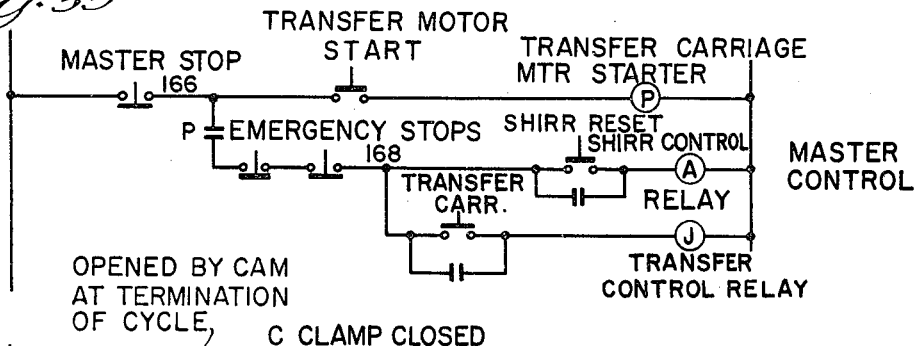
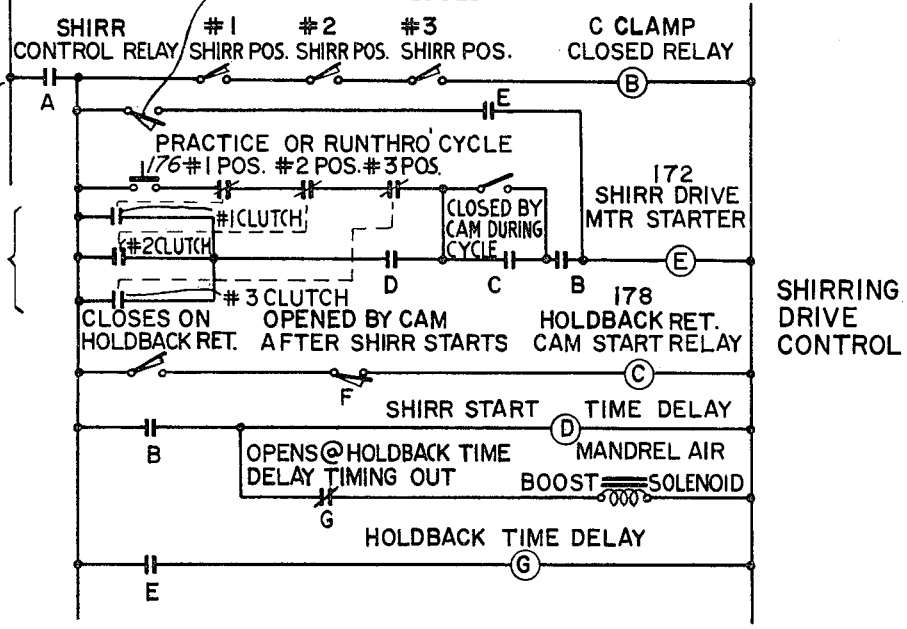
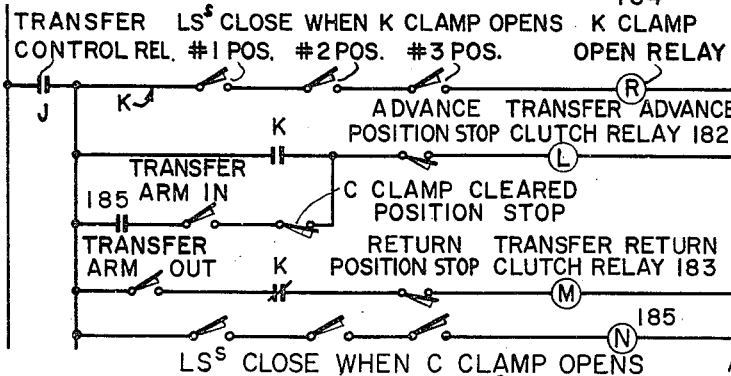

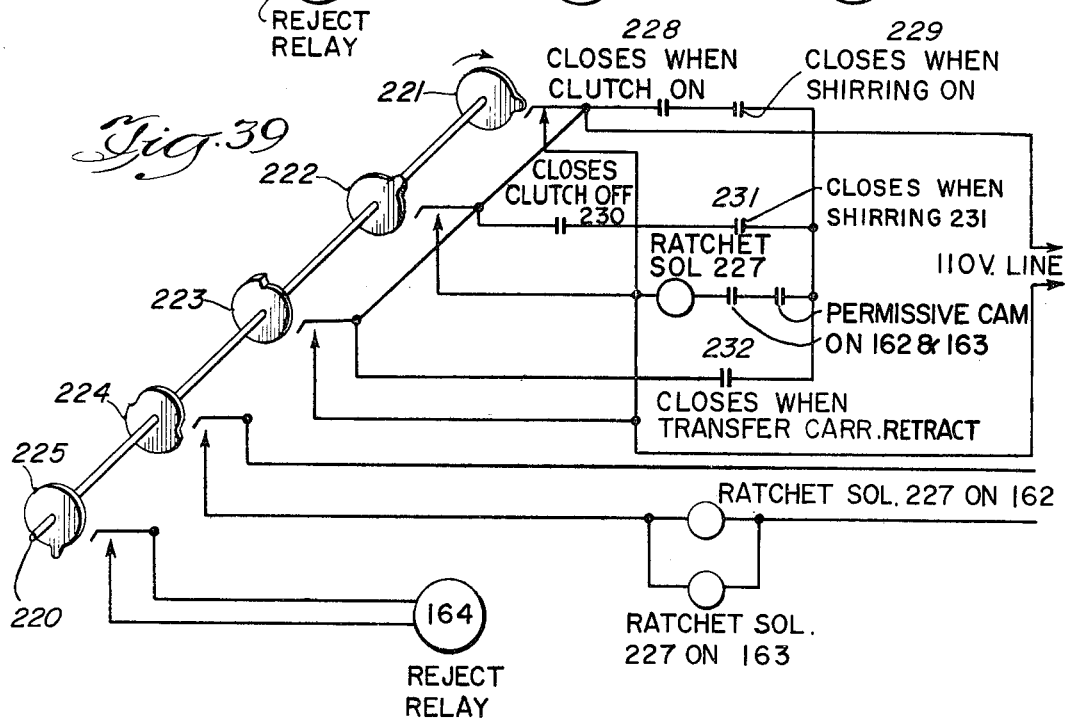

United States Patent Office

3,503,093
Patented Mar. 31, 1970

3,503,093
APPARATUS FOR PRODUCING SHIRRED FOOD CASINGS
Walter V. Marbach, Palos Heights, Victor K. Naudzius, Chicago, and Edward S. Sherman, Palos Heights, Ill., assignors to Union Carbide Corporation, a corporation of New York
Filed Aug. 18, 1967, Ser. No. 661,689
Int. Cl. A22c 11/02, 13/00
U.S. Cl. 17—42                                    7 Claims

ABSTRACT OF THE DISCLOSURE

Shirring and compression of food casings are accomplished on a multi-mandrel machine having common drive and control systems for a plurality of casing strands, the steps of shirring, compacting and severing being performed on each mandrel independent of action on each other mandrel despite common drive mechanisms. Provision is made for detecting and remedying discontinuities in casing material supplied to each mandrel and automatic systems reject casing lengths deviating from a predetermined standard.

---

This invention relates to an apparatus for producing shirring food casings. More particularly, the invention relates to apparatus that combines in one operating unit means for performing and controlling the successive steps for shirring a plurality of strands of tubing into compact shirred self-sustaining pieces of predetermined length for meat casings. Such tubing may be composed of proteinaceous or carbohydrate materials such as collagen, alginate or cellulosic material such as cellulose esters, cellulose ethers and regenerated cellulose, as well as other natural, synthetic or artificial materials useful for meat casings.

The conversion of continuous flexible tubing into a succession of shirred sticks of pedetermined lengths suitable for sausage casings involves a series of steps that have attained a recognized status in the art. These steps include: supplying metered quantities from a continuous supply strand of tubing (now to be referred to as "casing") to a mandrel in a shirring zone; inflating the casing and shirring or pleating the inflated casing strand on the mandrel in the shirring zone; severing a predetermined shirred length from the unshirred casing supply or a subsequent shirred length; transferring by advancing along the mandrel the shirred casing length to a compressing station and there compressing it in one or more steps into a durable article (commonly called a "stick") of predetermined internal diameter; and doffing the compressed casing from the compression mandrel to a packing station.

Machines heretofore provided have employed independent mandrels and independent means for driving and feeding; metering and shirring; severing; transferring and compressing each casing strand thereon; and doffing the casing therefrom. Operator attendance was required for each strand so shirred to detect supply reel runout, to detect and remove "tube couplers" which occur in the supply strand as later described, to thread on to the mandrel a fresh strand end, and to segregate short length casing resulting from discontinuity of the casing strand.

An object of this invention is to provide a multi-mandrel shirring apparatus that is cooperatively operated, and which has a higher rate of production and requires less operator attendance than heretofore. A further object is to produce uniform, predetermined length shirred casings from discontinuous, coupled or spliced supply sources. An additional object of the invention is to provide shirring means commonly driven and actuated, and commonly but selectively and individually controlled, in an apparatus concurrently shirring a plurality of casing strands and to provide further in such apparatus a commonly operated holdback means, a commonly operated transfer carriage, successively actuated operating means for mandrel gripping clamps spaced along the mandrels, commonly operated compressor means and commonly operated doffing means for delivering the finished casing from the mandrels.

Other objects of the invention are to provide means for detecting a splice, break or other fault or discontinuity in any one of a plurality of casing strands before such strands are shirred on the apparatus; to provide means for segregating and discarding short length shirred casings and casing containing faults, while continuing the shirring and the gathering of predetermined length shirred casings to a packing station.

The invention by means of which these objects are attained comprises an apparatus in which shirred casings are manufactured by shirring a plurality of tubings on a plurality of mandrels all under common control. The invention comprises metering a predetermined length of tubing onto a mandrel, shirring the tubing on the mandrel while applying holdback force thereto for example by means of mechanisms described in U.S. Patents 2,983,949 and 3,110,058 as a first stage of compression, and severing the shirred first stage compressed length. Axial force is applied to the trailing end of the severed shirred length to advance it further along the mandrel and subject it to compression against a first wall of a mandrel clamp as a second stage of compression. After removal of the clamp and wall, axial force is applied to the second stage compressed tubing to advance it further along the mandrel. The clamp is replaced on the mandrel, and axial force is then applied in the reverse direction to the leading end of the advanced second stage length on the same mandrel, to further compress the second stage length against a second wall of the mandrel clamp back toward the shirring zone as a third stage of compression. The compressed length is then doffed from the mandrel.

Preferably a subsequent length of tubing is undergoing the first stage while a first length is undergoing the third stage, and a second length is undergoing the second stage. The third stage fully compressed length is doffed from the far end of the mandrel at the same time that the subsequent lengths of casing are concomitantly advanced from the first stage to the second stage, and from the second stage to the third stage.

The apparatus of the invention includes a plurality of floating hollow mandrels; means for supporting the mandrels and maintaining them stationary; means for selectively feeding and shirring a predetermined measured length of casing material on to any of the mandrels; means operable for the cooperative severing, transferring, and compressing of the shirred casings in unison on all the mandrels; means operable to doff the casings in unison from the mandrels and segregate irregular casings from finished shirred casings; the entire apparatus being adapted to be actuated cooperatively in a repetitive cycle of operations by interlocking electrical and pneumatic means thereby operating one or more of the independent shirring means and all of the cooperative transfer, compressing and doffing means.

In the accompanying drawings:

FIG. 2 is a perspective view of the principal drive elements of the machine of FIG. 1;

FIG. 3 is a timing diagram of the machine cycle showing the cooperative actuation of the principal components of the apparatus of FIG. 1;

Figure 1:
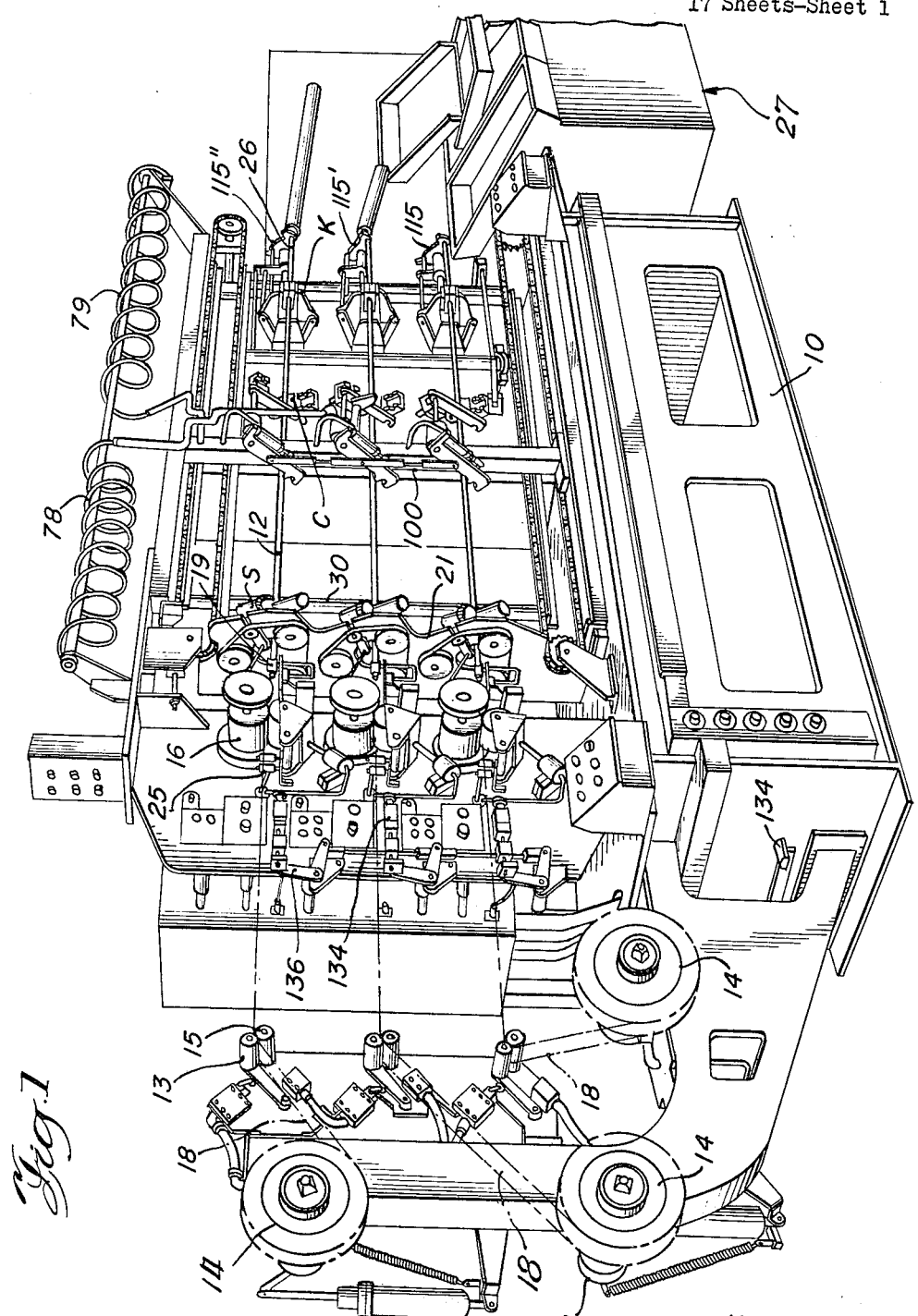
FIG. 1 is a perspective view of a three mandrel shirring machine according to a preferred embodiment of the invention.
Figure 15:
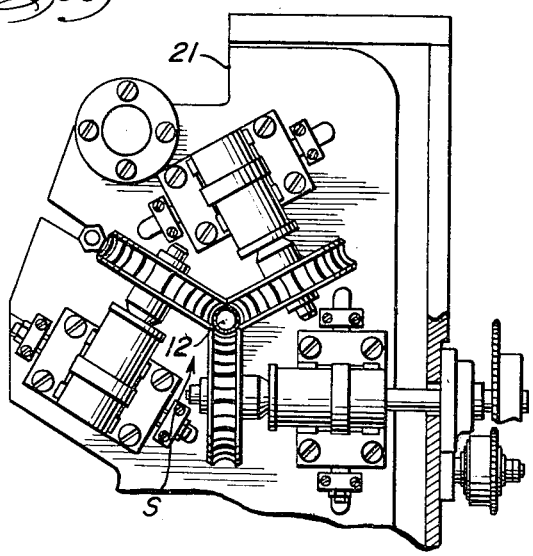
Figure 16:
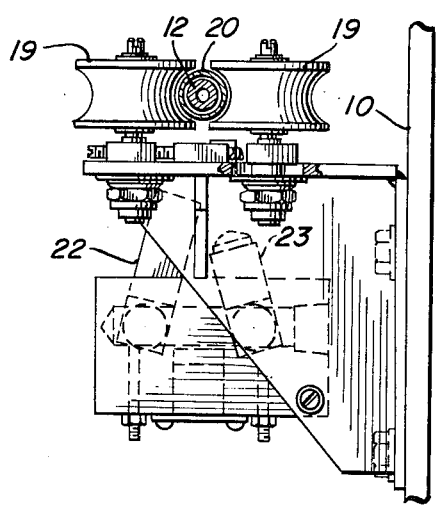
Figure 17:
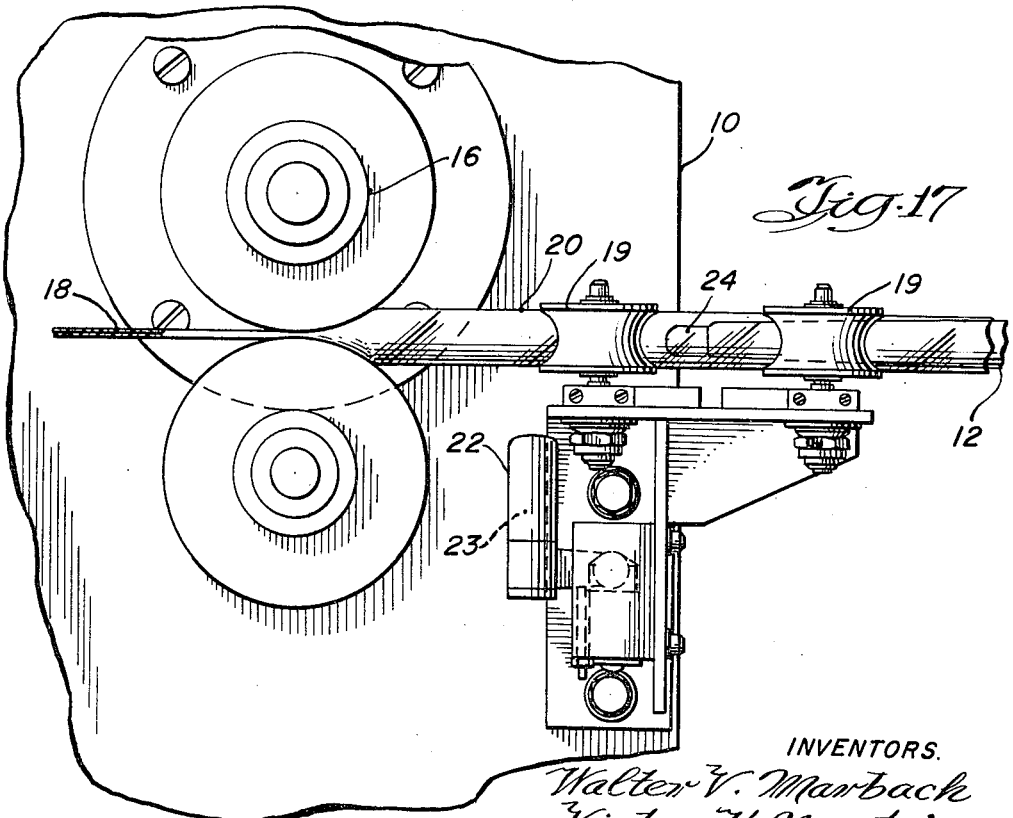
Figure 28:
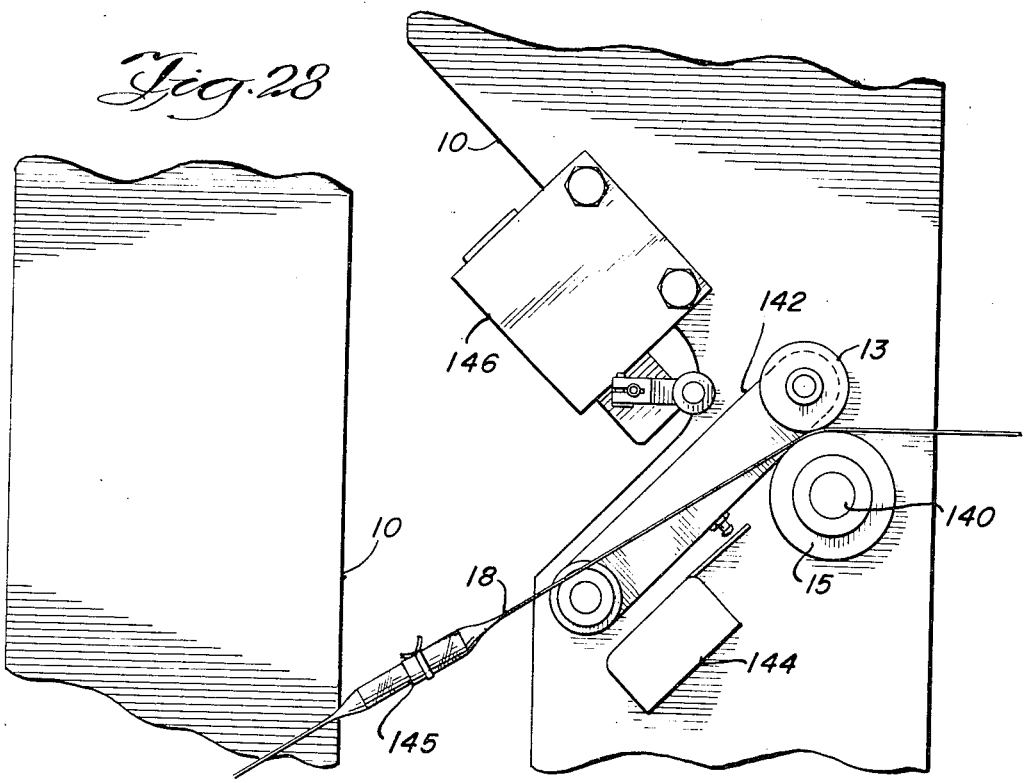
Figure 29:
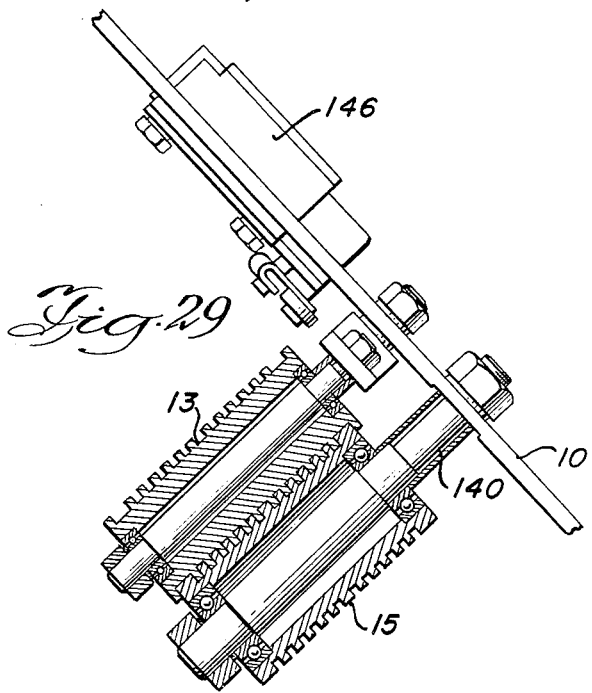
Figure 30:
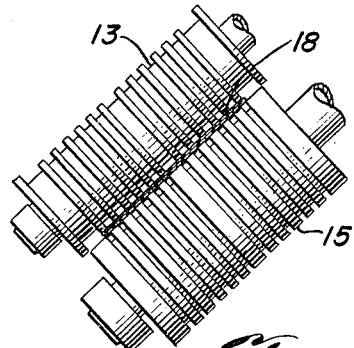

FIGS. 4 to 12 inclusive are diagrams of successive relative positions of parts of the machine of FIG. 1 showing different steps of operation;

FIG. 13 is an elevation of the transfer device assembly of the machine of FIG. 1;

FIG. 14 is an elevation of the holdback assembly of the machine of FIG. 1;

FIG. 15 is an end elevation partially in section of one of the shirring heads of the machine of FIG. 1;

FIG. 16 is an end elevation partially in section of the guide rolls of the machine of FIG. 1 showing the flare-up sensing means;

FIG. 17 is a side elevation partially in section of the apparatus of FIG. 16;

FIG. 18 is an enlarged detail elevation partially in section of the first clamp of the machine of FIG. 1 in open position;

FIG. 19 is a similar view showing the clamp of FIG. 18 in closed position;

FIG. 20 is a horizontal section partially in section taken along the line 20—20 of FIG. 22 showing the master shipper arm;

FIG. 21 is an enlarged detail elevation partially in section of one of the transfer arms shown in FIG. 13;

FIG. 22 is a plan view partially in section of a portion of the machine of FIG. 1 showing the final forward compression and the reverse compression of the casing against the clamp K;

FIG. 22A is an end elevation of one of the reverse compression arms shown in FIG. 22;

FIG. 23 is a side elevation of two superimposed splicing stations mounted on the machine of FIG. 1;

FIG. 24 is an enlarged detail plan of one of the splicing stations of FIG. 23;

FIG. 25 is a vertical section partially in section taken along the line 25—25 of FIG. 24;

FIG. 26 is a perspective of a partial splice in the casing to be shirred;

FIG. 27 is a similar view of the completed splice;

FIG. 28 is an enlarged detail elevation of the sensing device at the feed end of the machine of FIG. 1 showing a tube coupler approaching the device;

FIG. 29 is an enlarged detail view partially in section through the sensing rolls of FIG. 28;

FIG. 30 is a perspective of the interfitting sensing rolls of FIG. 28;

FIG. 31 is an end elevation of the packing unit for gathering the finished casings produced by the machine of FIG. 1;

FIG. 32 is a plan view of the packing unit shown in FIG. 31;

FIG. 33 is a side elevation of the packing unit shown in FIG. 31;

FIG. 34 illustrates diagrammatically the electrical circuits controlling the apparatus drive elements and operating components of the machine of FIG. 1;

FIG. 35 illustrates schematically the basic electrical circuits of the master control of the machine of FIG. 1;

FIG. 36 illustrates schematically the basic electrical circuits of the shirring drive control of the machine of FIG. 1;

FIG. 37 illustrates schematically the basic electrical circuits of the transfer carriage control of the machine of FIG. 1;

FIG. 38 illustrates diagrammatically the electrical circuits of the memory units of the machine of FIG. 1 for short length segregation;

FIG. 39 is an enlarged detail of a diagram of the electrical circuit of a typical memory unit as shown in FIG. 38.

For convenience in describing the invention, reference will be made to apparatus having three shirring mandrels arranged in three shirring positions, but it is to be understood that there may be more or fewer mandrels. As the same operations occur on each mandel, for conciseness and clarity, the invention will be described generally with reference to the operations on but one mandrel.

In the invention flattened tubing is led from a supply reel through fault detecting means to metering and feeding rolls onto a stationary hollow mandrel on which the operations of shirring, severing, compressing and doffing are accomplished by mechanisms to be described with particular reference to the apparatus of the invention. Air to inflate the tubing and assist in centering and advancing it along the mandrel is supplied to the mandrel's fore end through means in one of a plurality of spaced mandrel clamps. The clamps are adapted to maintain the mandrel in a stationary position. One clamp provides an abutment for compressing the shirred casing between the clamp and compressing means. The hollow mandrel is adapted to support the casing lengths in the three stages of shirring and compression, and the final compression (stage three) takes place on a portion of the mandrel extended rearwardly of the second clamp. The machine has an arrangement for momentarily increasing the pressure of casing inflating air from about 6 p.s.i. nomally used to about 18 p.s.i. to stiffen and advance the inflated tubing thereby enabling the shirring means to effectively grip and pleat the casing at startup.

A predetermined length of casing is shirred by means well known in the art, and is advanced from the zone of shirring along the mandrel as it is shirred against a retracting surface mounted on a holdback carriage. After the desired length of casing has been shirred, as the first stage, the feed rolls and the shirring means are stopped. A shirring carriage mounting the shirring means is then retracted from the shirred casing.

A pair of jaws mounted on a transfer carriage engage to encircle the mandrel and grip the unshirred tubing adjacent the shirred casing's trailing end. The transfer carriage is then advanced and the jaws sever the shirred length from unshirred casing allowing the shirred casing to be advanced along the mandrel through the opened first clamp and to compress the trailing end of the shirred casing against the front of the second mandrel clamp as the second stage.

The first clamp is then closed, the shirring carriage is advanced to the zone of shirring and shirring of the next casing length begins. Later in the cycle, the second clamp is opened and the transfer carriage advances the second stage casing to the mandrel extension. The transfer jaws are disengaged from the mandrel and the transfer carriage is retracted to the shirring zone to sever the just-shirred length of casing. The second stage casing now on the mandrel extension, is compressed rearwardly against the second clamp as the third stage by jaws on an arm adapted to cooperate concurrently with the compression of the second stage length. The second clamp opens and an arm (hereafter referred to as a "shipper arm") engages the mandrel intermediate the second and third stage lengths. Concurrently as the transfer carriage advances the second stage length, the shipper arm advances the third stage length to doff it from the mandrel extension to a receiving bin for packing the finished casings.

Means for detecting faults in the casing are provided at the feed end of the machine. As the strand of casing is unwound from the supply reel, randomly occurring irregularities such as rubber tube couplers or discontinuities and "flareups" (hereinafter defined) in the strand are advanced toward the surfaces of mating sensing rollers mounted between the supply reel and the feed rolls. When a casing fault displaces the upper pivotally mounted sensing roller from the normal operating position, such displacement actuates an electric switch that trips the first stage of a five-cam memory switch, disengages the clutch driving the feed roll and shirring head, energizes the feed roll brake, and signals the event.

On an occasion when the length of the inflated casing that is advancing intermediate the metering rolls and the shirring means becomes greater than the shortest distance therebetween, the casing becomes displaced from true alignment with the shirring passage. If such misalignment becomes extreme, it usually causes a tangle or wrapping of casing about the metering rolls and thereby interrupts the desired shirring of the casing. Such a tangle is commonly referred to as a "flare-up." Photo-electric sensing means are used to anticipate the degree of misalignment that normally would cause a flare-up and said photo-electric means operates through a relay to halt production before damaging casing wraps or flare-ups can occur.

Referring now to the drawing, as may be seen from FIG. 1, in the operation of the machine a supply of flattened tubing, such as cellulosic tubing 18 is intermittently withdrawn from a supply reel 14. The length of tubing 18 on the reel 14 may contain one or more successive rubber tube couplers 145 (FIG. 28) resultant from the manufacture of continuous reelable tubing.

From the reel 14 the flattened coupled tubing passes between sensing rollers 13 and 15, which actuate sensing devices hereinafter described in response to the passage of a coupler, splice or tubing end therebetween, to facilitate the removal of the coupler, and splicing the resultant ends of the tubing.

The flattened tubing 18 is expanded as by gaseous means and advanced through vertical guide rolls 25 to metering rolls 16 (FIG. 17) and the metered inflated tubing 20 is aligned centrally by two pairs of annularly grooved rolls 19 arranged in tandem, which guide the tubing onto hollow mandrel 12 and through a zone of shirring S.

The desired length of inflated casing is loosely shirred by any of a number of suitable shirring heads among which for example are those as shown in FIG. 15 and described in Matecki U.S. Patents 3,097,393; 2,983,949 and 2,984,574 against a holdback surface carried by cooperatively yielding holdback carriage 30 slidably mounted on machine frame 10. In the machine illustrated in FIG. 1 three of such heads are mounted on the same shirring head carriage 21 which is arranged to be advanced and retracted parallel to mandrel 12. Carriage 21 is slidably mounted on machine frame 10.

As shown in FIG. 17 the leading end of the hollow mandrel 12 has a tip 24 through which gaseous inflating means is supplied to the casing 20. The mandrel 12 is supported in stationary position by clamps C, K, later described with its leading end positioned between the shirring head S (FIG. 1) and the nip of the metering rolls 16. A trailing end 26 (FIG. 1) of the mandrel 12 is extended beyond the clamp K to accommodate the third stage of shirred casing.

As shown in FIGS. 16 and 17 photo-electric means for sensing a flare-up of the inflated casing is positioned intermediate metering rolls 16 and mandrel tip 24 and comprises a light source 23 that is reflected from the undersurface of inflated casing 20 to photo-cell 22 when the casing is properly aligned with the mandrel during shirring. When the inflated casing 20 is not so aligned the indication from the photo-cell trips a relay to halt production in the shirring position involved.

As before indicated there are three shirring positions and each has similar associated apparatus performing the operations of the invention. For clarity and conciseness the operation and apparatus of one such shirring position is described, it being understood that the operation and apparatus of the other shirring positions are similar unless otherwise stated. In the drawings (particularly in FIGS. 2, 13, 14, 22, 22A), where such similar parts exist they are referred to by the same reference character, the additional parts being designated by superscript, i.e. 40, 40′, 40″.

Referring now to FIG. 2, the main drive motor 32 is intermittently operated during each shirring cycle to drive jackshaft 36 through timing belt 34. Jackshaft 36 drives metering rolls 16, 16′, 16″ through timing belt drive 38 and shafts 40, 40′, 40″ which are belted together by belts 28, 28′. Shafts 40, 40′, 40″ in turn drive shirring heads S (FIG. 1) through chains 44, 44′, 44″. Clutch-brake 39 may connect or disconnect shaft 40 from drive 28 to isolate one shirring position from the other shirring positions. Chains 44, 44′, 44″ also drive shafts 45, 45′, 45″ which through belts 46, 46′, 46″ drive lubricators 47, 47′, 47″.

Jackshaft 36 also drives cycle cam shaft 52 through timing belt 51, speed reducer 56 and change gear train 50. Jackshaft 36 also drives the holdback carriage 30 through timing belt 51, and chain drive 58. Chain drive 58 drives speed reducer 59 which through electrical clutch 60 drives vertical shaft 61. Gears 62, 62′ drive racks 63, 63′ which advance holdback carriage 30. For the return stroke the clutch 60 is deenergized, and the gear 64 is driven by rack 65 from cylinder 66.

The transfer carriage 100 is slidably mounted on frame 10 and is driven by motor 68 which continuously drives shaft 69 and through belt 71 drives shaft 72. Through upper clutch 73′ (mounted on shaft 72) speed reducer 74′ provided with brake 75 drives upper chain 76′, and through timing belt 77 drives lower speed reducer 74 and lower chain 76 in the same direction. By energizing lower clutch 73 and deenergizing upper clutch 73′ the direction of the drive of chains 76, 76′ may be reversed and transfer carriage 100 is thus reciprocated to and from the zone of shirring S.

FIG. 3 is a bar chart diagram of the timing for the sequence of operations comprising the cooperative means for shirring and severing the casing strands, and for transferring, compressing and doffing the casing sticks in unison. The bars of the chart illustrate the percentage of the machine cycle time during which each major machine component is operative or inoperative; or is advanced or retracted; or is opened or closed. The sequence of operative steps for three mandrels is further shown and described in FIGS. 4 to 12. Transfer carriage 100 is advanced in two separate steps (FIGS. 6, 11) during the cycle, but is retracted completely in a single step (FIG. 9).

Referring now to FIG. 14, the holdback carriage 30 is provided with three arms 80, 80′, 80″ pivoted thereon, one for each mandrel, and connected to each other by links 81, 81′. Each of the arms 80, 80′, 80″ is alike, and each carries like associated parts. For conciseness, only one arm, 80, and its associated parts will be described. The arm 80 carries pivoted jaws 83 and 84 surrounding the mandrel and being held together by spring 85. The jaws 83, 84 form a moving holdback wall against which the casing is shirred. The weight of the jaws is counterbalanced by spring 86 flexed about a pivot. After the shirring is completed, the arm 80 is raised by a link 87 and a square shaft 88 which is activated by the operation of clamp C next to be described.

During the shirring cycle, the mandrel 12 is supported by a first clamp C shown in FIGS. 1, 18 and 19, bolted in position on the machine frame 10. The clamp C has an upper jaw 90 pivoted on a shaft 92, and a lower jaw 91 pivoted on shaft 93. The clamp is closed by cylinder 96, which pushes a yoke 97 and links 98, 98′. These links push pivots 94 and 95 to swing the jaws about shafts 92 and 93. This causes rotation of the lower shaft 93 which through a pair of gears, not shown, causes opposite rotation of shaft 88 shown in FIG. 14.

After the clamp C is opened and the holdback jaws 83, 84 are disengaged from the mandrel 12, the transfer carriage 100 shown in FIG. 13 and now to be described comes into action. Meantime the shirring head has retracted and the transfer carriage 100 has returned to the retracted end of its travel.

The transfer carriage has pivoted thereon three transfer arms 101, 101′, 101″ one for each mandrel 12, which are interconnected by links 102, 102', 102" and actuated by double-acting cylinder 103, to pivotally raise and lower each arm into and out of position encircling the mandrel 12. Raising the arm 101" opens valve 104 which pressurizes a common supply manifold mounted on transfer carriage 100 (FIG. 1) to pressurize spring-return cylinders 105, 105', 105" simultaneously, one on each arm 101, 101', 101". Lowering the arms 101, 101', 101" closes valve 104 and vents air from cylinders 105, 105', 105". Cylinder 103 is raised and lowered by a double acting pilot operated valve (not shown) which is mounted on frame 10 and connected to the transfer carriage 100 by coiled flexible hoses 78, 79. As may be seen in FIG. 21, cylinder 105 (which is identical in contsruction and operation to cylinders 105' and 105" and has identical associated parts) actuates gear 106 which closes jaws 107 about the mandrel.

The transfer carriage 100 now advances along its travel to compress the shirred casing in stage 2 against the closed second clamp K, as shown in FIGS. 1, 22 and 22A. The operative details of clamp K are similar to clamp C shown in FIGS. 18 and 19 as described above. In its travel the transfer carriage trips valve 108, which energizes cylinder 109 to turn the column 110. The column carries arms 111, 111" the outboard ends of which cam the transfer device 100 to give a final forward compression of casing in stage two against the front of clamp K. At the same time, the inboard end of the arm 111 pulls rod 112, which turns column 113; column 113 has three arms 114, 114', 114" which cam reverse compressor slides 115, 115', 115" on rods 116, 116', 116" (aligned with clamp pivots 92, FIG. 19). The slides 115, 115', 115" give a final rearward compression of casings supported on each mandrel in stage three, against the rear of closed clamps K. The slides 115, 115', 115" each have an arm 117, 117', 117" which slides along the extension of shaft 94 mounted in the upper jaw of clamps K and thereby compresses springs 119 on shaft 94. When the clamp K opens, shafts 94 turn arms 117 which turn slides 115 around pivot shafts 116 to disengage the reverse compressor jaws, and springs 119 return the slides 115 to their original position.

Refer now to FIG. 20 which illustrates in detail one set of parts for one mandrel. It should be understood that each mandrel has an identical set of such parts, but for clarity the description will proceed with reference to but one. The transfer carriage 100 has mounted thereon rods 120 parallel to each mandrel 12 on each of which rods are journaled shipper arms 121 pivotally interconnected to each other by links 22. Each shipper arm 121 has latch means that are tripped upon the opening of clamp K to cause the shipper arm 121 to engage with mandrel 12 independent of the operation of transfer arm 101. The shipper arm 121 is disengaged downwardly from the mandrel 12 and is rotated into a pretensioned latched position when the transfer arm 101 is disengaged from the mandrel 12. Latch means comprise tongue 124 attached to the upper jaw of clamp K that cams and unlatches pawl 126 when the clamp opens. Pawl 126 is thereby disengaged from latch pin 127 affixed to shipper arm 121 and thereby releases the shipper arm 121 to be rotated upwardly by spring 123 until jaw 130 engages mandrel 12 intermediate of the compressed casing sticks of stages 2 and 3. Latch pawl 126 is rotatable on pivot 129 and urged against the latch pin 127 by spring 128. When the transfer arm 101 rotates downwardly out of engagement with mandrel 12, shaft 120 and set pawl 132 fastened thereto, are also rotated. Set pawl 132 cams set pin 133 that is fastened to the shipper arm and thereby rotates the shipper arm 121 downwardly to disengage it from mandrel 12. As the shipper arm is rotated, spring 123 is tensioned and latch pin 127 slides along the under surface of pawl 126 until the catch 125 drops over pin 127 and latches the shipper arm in disengaged position for the next cycle. The operation of the shipper arm 121 and the transfer arm 101 may be better visualized by reference to FIGS. 4 and 5 next described.

In FIG. 4 the holdback carriage 30 is in its fully retracted position, and the shirring head S is starting to shirr stage 1 on mandrel 12 against the holdback jaws on arm 80. Clamps C and K are closed to hold the mandrel 12 stationary. The compressor cylinder 109 is camming the transfer carriage 100 to continue the compressing of the casing in stage 2 against the front of closed clamp K. The compressor cylinder 109 is also operating as previously described on arm 114 to reversely compress stage 3 against the rear of clamp K on the trailing end 26 of the mandrel. As shown in the bar chart of FIG. 3, these operative conditions have been established at about 3% of the machine cycle time.

In FIG. 5 the holdback carriage 30 has advanced with the shirring operation of stage 1. Clamp K has opened, cylinder 109 has released transfer carriage 100 and also arm 114. The opening of clamp K also swings the shipper arm 121 up into position against the mandrel between stages 2 and 3. These operative conditions have been established at about 65% of the machine cycle time.

In FIG. 6 the transfer carriage 100 has advanced to the forward end of its travel to thereby advance the casing from stage 2 through the open clamp K to stage 3 position, while shipper arm 121 has advanced to eject the casing from stage 3 and doff it from the mandrel end 26. Meantime the shirring carriage 21 has been retracted thereby retracting shirring heads S away from the last shirred casing pleat. These operative conditions have been established at about 71% of the machine cycle time as shown in the bar chart of FIG. 3.

In FIG. 7 the clamp K has closed, and reverse compressor arm 115 has engaged the mandrel. Transfer arm 101 and shipper arm 121 are both retracted from the mandrel. These conditions have been established at 72.5% of the machine cycle.

In FIG. 8 the first clamp C is open, holdback arm 80 is raised, and holdback carriage 30 and transfer carriage 100 are ready for their return strokes at 75% of the machine cycle time.

In FIG. 9 holdback carriage 30 and transfer carriage 100 have returned to starting position at about 85% of the machine cycle.

In FIG. 10 transfer arm 101 is raised, jaws 107 engage the unshirred casing on the mandrel 12 and transfer carriage 100 starts to advance the shirred casing from stage 1 along the mandrel 12 thereby tensioning the unshirred casing and severing the shirred casing therefrom. At the same time the shirring carriage 21 starts to advance the shirring heads S toward the shirring position. These conditions have been established at about 87% of the machine cycle time.

In FIG. 11 transfer carriage 100 has advanced the casing from stage 1 through the open clamp C to stage 2 position, and the transfer arm 101 is precompressing the shirred casing against the closed clamp K. Meantime the shirring carriage 21 has advanced to return shirring heads S into shirring position. These conditions are established at about 97% of the machine cycle.

In FIG. 12 clamp C is closed and the compressor cylinder 109 is camming transfer carriage 100 to compress the casing in stage 2 against the front of closed clamp K. The compressor cylinder 109 is also operating on arm 114 to reversely compress stage 3 against the rear of clamp K. These conditions are established at about 99% of the machine cycle and the parts are again in position for the action described with FIG. 4.

Following is a summary of the shirring, compressing, doffing operations of the apparatus illustrated. Before the start of a cycle, the shirring carriage 21 is in its advance position, both clamps C and K are closed, and the holdback carriage 30 is adjacent to the shirring heads S. The transfer carriage 100 is intermediate the clamps, and the casing compressor 109 is activated by electrical and air means. The casing inflation air pressure is off.

The first signal at the start of a cycle provides casing inflation air pressure at about 25 p.s.i. (FIG. 3).

The rolls of the shirring heads S and the metering rolls 16 start to operate after about 2½% of the machine cycle time, and after about 3% of the machine cycle time the casing inflation air pressure is reduced to about 8 p.s.i. The holdback carriage 100 starts to advance after about 5% of the machine cycle time and continues to advance as shirring progresses providing yielding restant to the shirred casing to preferably 70% of the machine cycle time, when the feed rolls and shirring are stopped and the casing inflation air pressure is cut off. At about 65% of machine cycle time during the shirring, the second clamp opens.

As the second clamps K are opened, the shipper arms 121 on the transfer carriage 100 move into engagement with the mandrels 12 between the casing sticks of stage 2 and stage 3. When the transfer carriage 100 advances past the second clamp area, both the shipper arm jaws 130 and the transfer arm jaws 107 advance their respective sticks of casing, to eject the reversely compressed stage 3 sticks from the ends 26 of their respective mandrels and to transfer the subsequent forwardly compressed stage 2 sticks into position for reverse compressing.

The transfer arms 101 are then disengaged from the mandrels 12 and through the latch means linkage 132, 133 also disengage the shipper arms 121 from their respective mandrels. The second clamps K are then closed and the first clamps C are opened; the transfer carriage 100 and the holdback carriage 30 are returned toward the shirring zone S.

When the transfer carriage 100 starts to return the shirring carriage 21 retracts from the last shirred pleat (see FIG. 6) to permit the transfer carriage arms 101 to move into engagement with the mandrels 12 and the casing thereon, and cylinder operated jaws 107 are activated to grip the casing 20 on each of the mandrels 12. The transfer carriage 100 starts to move forward and the gripping jaws 107 tension and sever the stage 1 shirred casing from the unshirred portion (see FIG. 10).

The transfer carriage 100 is then advanced and the gripping jaws transfer the shirred casing through the open first clamps C. The shirring head carriage 21 is advanced to shirring position as the transfer carriage 100 is advanced. Then the first clamps C close and the casing sticks are compressed by abutment against the second clamps K, one stick forwardly at stage 2 and one stick rearwardly at stage 3 on each mandrel.

As previously indicated, casing irregularities and other problems are encountered in the feeding of the casings as continuous regular inflated strands on to the mandrels and means are now described for coping with the problems.

The strand coupler and strand break sensing means, 13, 15 (FIG. 1) is located ahead of the feed roll 16 and adjacent the supply reel 14 for each shirring position. As shown in FIG. 28, a lower sensing roll 15 is journaled on a stationary axle 140 bolted onto the machine frame 10, and an upper sensing roller 13 is journaled on a link 142 pivoted on frame 10. The rolls have interfitting circumferential grooves and ridges, which are held apart by the passage therebetween of the flattened tubing 18 as shown in FIG. 30.

When a terminal end of flattened tubing 18 passes beyond the sensing rolls, the upper roll 13 drops into interfitting relation with the lower roll 15 as shown in FIG. 29. The link 142 (FIG. 28) drops therewith and closes switch and relay 144 to unclutch and brake the shirring head S and the metering rolls 16, (FIG. 17) and thereby actuate a memory device as later described.

When a tube coupler 145 shown in FIG. 28 reaches the sensing rolls, the upper roll 13 is raised, and the link 142 is raised therewith to close switch and relay 146 to also unclutch and brake the shirring head S and the metering rolls 16, and thereby activate the memory device.

When a flare-up of the inflated casing occurs, the photoelectric sensing means previously described (FIGS. 16, 17) closes flare-up relay 147 (FIG. 34) to also unclutch and brake the shirring head S and the metering rolls 16, and thereby actuate the memory device. For safety in clearing the casing from a tangle caused by a flare-up, the entire machine is stopped.

Coupler and break sensing rollers 13, 15 for each of the mandrel positions, control independent electric clutchbrakes 39 that connect the common machine drive (FIG. 2), to the associated shirring position, metering roll 16 and shirring head S. Thus, when sensing rollers for one mandrel position sense a coupler the metering rolls and the shirring operation for that position only, are stopped. Meanwhile, the machine operations are automatically sequenced at the other commonly driven shirring positions. The machine cycle for successively sequencing the common severing, transferring and compressing of full length casings in two stages continues at all the other mandrel positions of the machine. The short length pieces of the coupler sensed position are segregated from full length production as later described. When the metering roll clutch-brake 39 is deenergized, a separate control 149 (FIG. 34) shuts off the casing inflation air supply to the mandrel 12 of the inoperative shirring position.

When a shirring head is stopped by reason of a casing fault, the operator may remove the tube coupler 145 and make a butted tape splice in the casing strand. As a first step the operator decreases the supply reel tension in the strand in conventional manner to provide slack for making a splice.

Strand splicer means are provided for each mandrel position. Such means are shown in FIGS. 23, 24, 25. The strand splicer means are each fastened to the machine frame 10 intermediate sensing rolls 13, 15 and vertical guide rolls 25 (FIG. 1) slightly below the strand 18 centerline. Foot pedal 134 is connected through link 135 to bell cranks 136 pivoted at 137. Each bell crank is connected to movable clamp block 155 by pivot 138 and slide means. Block 155 is aligned in a slide with fixed clamp block 154. Block 155 is normally maintained in open position by a tension spring, not shown, connected to link 135.

As shown in FIG. 25 an operator may arrange that portion of casing strand containing the tube coupler 145, into a depending loop 152 intermediate the opposing surfaces of the opened splice clamp blocks 154, 155. Clamp block 155 is closed against block 154 by depressing foot pedal 134 and stretching the tension spring. The fore and aft casing strand portions are aligned and maintained in abutting arrangement as the clamp blocks are closed upon the strands with the tube coupler 145 underneath and free of the blocks.

As shown in FIG. 26 a piece of pressure sensitive tape 156 cut to a length greater than two casing widths is applied transversely onto the upper plies of the clamped casing 18 where the fore and aft strand portions abut. The clamped loop 152 (containing the tube coupler) is then cut free from the abutted strands 18 by knife 158.

As shown in FIG. 27 the splice in the cut off strand is completed by wrapping the extended portions of the tape about the casing, to form an air tight butt seal in the casing strand. The clamps are released, dropping the loop therefrom for the next splicing operation.

The steps in the operation of making a tape splice between the trailing end of a reel and leading end of a new supply reel, are essentially the same as that of making a splice when removing a tube coupler.

The delivery end of the shirring machine is provided with a packing unit shown on FIG. 1 generally as 27. The packing unit receives and gathers finished predetermined length shirred casing sticks from each shirring mandrel and conveys them to separate packing stations. The packing unit has means responsive to signals from the memory device to separate from finished production the undesirable short length casings and reject them to a scrap bin. The packing unit transfers without breaking the casing sticks from the mandrels to a receiving bin where they are gathered in parallel relation for ready packing into a shipping container.

Refer now to FIGS. 31, 32 and 33. When a finished casing stick is doffed from the top mandrel's trailing end 26 it is longitudinally guided by slopingly aligned movable conduit 200 and fixed conduit 202 to the transversely sloped arresting trough 190 provided with hinged gate 192. The trough wall and gate 192 arrest the casing stick in parallel relation to the gate. When the next compresnion cycle of the machine occurs, the operation thereof by cylinder 109 through rod 112 pulls cable 204 and through pulleys 205, the cable moves arm 193 to pivot gate 192 and allow the casing stick to roll about its axis transversely down successively aligned troughs 194, 196, to receiving bin 198. Finished casing sticks are accumulated in a parallel pile in bin 198 until at the operator's option they are packed into shipping containers. The finished production from each mandrel is thus segregated for quality control.

When an undesirable short length casing is about to be doffed from mandrel 26, the memory means responsive to the casing's advance through the machine provides a signal through relay 164 (FIG. 34) that activates cylinder 206 and through link 208 rotates conduit 200 about pivot 209 to swing it out of alignment with conduit 202. Then when the short length casing is doffed from the mandrel, it slides down conduit 200 to a scrap bin.

For the middle mandrel position no fixed conduit is neded to convey the casing to arresting trough 190. The transversely sloped trough 190 and receiving bin 198 are aligned with intermediate trough 194 to control the transfer of the casing from arresting trough 190 in a manner similar to that described above.

For the lower mandrel position a hinged arresting gate 192 is provided in receiving bin 199. The hinged gate is operated by cable and pulley means similar to that used for the upper mandrel gates 192. Means for rejecting short length casings to scrap are provided by a trap door 212 hinged about pivot 219 in the floor of bin 199. The signal from memory means relay 164 to reject short length casing from the lower mandrel position activates cylinder 216 and through link 218 opens trap door 212 about pivot 219 to permit the short casing to fall through to a scrap bin.

FIG. 34 diagrammatically illustrates the electrical control circuits for a cooperatively operated three strand shirring machine. Refer also to FIG. 2. For each strand of casing there is provided individual electrical means for detecting and handling interruptions in strand continuity. These means comprise detecting switch-relays 144, 146; strand flare-up detecting relay 147; relay 148 to advance only a short length of spliced strand to complete the shirring cycle; relay 150 to start and stop only the shirring of that strand; and relay 149 to control casing inflation pressure. There is also provided a memory unit shown generally as 160, that controls the advance of any short length strand successively through the shirring, transfer, compressing cycles and then anticipates the doffing cycle to trip reject relay 164 and thereby reject short length casings to a scrap bin.

FIG. 35 illustrates schematically the basic master control circuit for the shirring machine and provides means for a master stop 166 and emergency stops 168 to control all operations on the apparatus. It also provides for a start circuit means 170 for the transfer carriage motor 68 which normally runs continuously throughout the sucessive shirring cycles.

FIG. 36 illustrates schematically the basic shirring drive control circuit and provides motor starter means 172 for starting and stopping the shirring motor 32 during each successive shirring cycle. Starting and stopping of the shirring drive motor is controlled primarily by relay 172 actuated by a cam on shaft 52 through gear train 50 that measures the predetermined length of casing to be shirred. Relay means 176 is also provided for a practice or run-through cycle on each shirring position. The practice cycle may be energized only when all three shirring clutches 39 are deenergized. This same circuit 176 is used to complete a shirring cycle when actual shirring of casing is halted before the complete machine cycle is terminated. A supplementary circuit is provided by relay 178 to insure that the holdback carriage 30 is in fully retracted position before any shirring of casing can be initiated.

FIG. 37 illustrates schematically the basic control circuit for transfer carriage 100. It provides means for advancing by relay 182 and retracting by relay 183 the transfer carriage 100 to energize separate clutch means 73, 73' alternately engaging the continuously operating drive means 74 from motor 68. Interlock relays 184, 185 are provided to insure clearance of the transfer carriage only through the fully opened mandrel clamp K and mandrel clamp C. Switch means are provided to permit the advancing and retracting operation of the transfer carriage 100 only after the extreme limits of its travel have been reached.

After a splice is completed the short length relay 148 (FIG. 34) is momentarily closed, and at the start of the next shirring cycle, the metering roll clutch 39 on the shirring position related to the splice-containing length of casing is energized for a predetermined time interval sufficient only to advance it along the mandrel 12 just in advance of the shirring passage 2 and then clutch 39 is again deenergized to halt operation of that shirring position. Thus, the amount of casing rejected to scrap is minimized. Meanwhile the other components of the machine are pneumatically-electrically controlled sequentially to continue operation of the other shirring mandrel positions to obtain full length shirred casings therefrom. When the machine next cycles to that operation where the transfer arm means severs the full length shirred casings from the unshirred strands; the short splice-containing length casing is also severed, transferred, compressed, etc. to be finally segregated and rejected from full length casing production, as later described.

The transfer and final rejection of short length casing is controlled by a memory unit 160 shown in FIGS. 34 and 38. One unit 160, 160', 160" is provided for each shirring position. Memory unit 160 is comprised of three stepping switches 161, 162, 163 electrically connected in cascade circuitry to control rejection of scrap of a first short length casing, and an immediate succeeding second short length (or splice-containing) casing, and an immediate succeeding third short length casing, and so on. Each stepping switch 161, 162, 163 serves to sense the position of a unit short length casing assigned to it, as the casing is advanced through the three operative stages of shirring, forward compression, and rearward compression; and the assigned switch counts that casing length through the three stages to finally operate relay 164, where upon the doffing from the mandrel end 26, the short length casing will be rejected to scrap. First stepping switch 161 is indexed initially to a ready state and thence to a detecting state by a set of conditions determined by a normal shirring operation, as later described. The circuitry is so arranged that when switch 161 is tripped to start the count out of a short length casing through the three stages, second stepping switch 162 is indexed through a ready state to a detecting state, and in a like manner if 162 is tripped, third stepping switch 163 is similarly activated.

Refer now to FIG. 39 which shows diagrammatically a cam stepping switch typical of 161, 162, 163 that comprise in combination the typical memory unit 160. Switch 161 is comprised of five cam operated switches. The cams 221, 222, 223, 224, 225 are commonly mounted on shaft 220 that is rotatable to repeat through a five cycle sequence by conventional pawl and ratchet means operated by ratchet solenoid 227.

In FIG. 39 first stepping switch 161 is shown typically in index position with cam switch 221 closed in a ready state. Shaft 220 has been indexed from the previous reject cam switch 225 index position by signal from the operation of transfer carriage 100 as later described. When both the metering roll clutch 39 (FIG. 34) is energized and the shirring cycle is activated a circuit is completed through contacts 228, 229 that energizes solenoid 227 to ratchet shaft 220 and thereby index and close detecting cam switch 222. Although switch 222 is closed, the circuit through 230, 231 is open when clutch 39 is on and shirring continues. The closing of contact 232 by means responsive to each reciprocating motion of transfer carriage 100, does not ratchet shaft 220 of switch 161 in the detecting state because switch 223 is open. First stepping switch 161 remains in the detecting state until an event occurs that next deenergizes clutch 39 during shirring.

When for example, a first tube coupler or strand break is detected and relays 146 or 144 deenergize clutch 39 during shirring, contacts 230, 231 close in switch 222 circuit and energize solenoid 227 to ratchet shaft 220 from the detecting stage to index and close count out cam switch 223. Thereafter upon each successive signal from the transfer carriage motion, contact 232 closes and shaft 220 is ratcheted once. Cam 223 has a lobe that maintains the switch 223 closed through three cycles to count out the casing through three operative stages to doffing. At the next transfer carriage motion signal, shaft 220 indexes to close permissive cam switch 224. During count out of cam 223, switch 224 thus permits the ratchet solenoid 227 of second stepping switch 162 to be energized from a ready state to a detecting state for its count out of a successive short length casing providing the machine conditions are favorable as before. At the next transfer carriage signal, shaft 220 of first stepping switch 161 indexes to close reject cam switch 225 and activate relay 164 rejecting the short casing to scrap. At the next transfer carriage signal, shaft 220 indexes cam 221 to the ready state to repeat the control sequence.

When permissive cam switch 224 closes, it isolates first stepping switch 161 from strand interruption relays 144, 146, 147 and by-passes the next transfer signal around 161, to place second stepping switch 162 in a ready state and thence to the detecting state if clutch 39 is on and the machine is shirring. Second stepping switch 162 is thus activated to trip upon detection of the next successive strand interruption and count through three stages of operation to reject a second short casing to scrap. When the second successive short casing is detected, second stepping switch 162 also is isolated from strand interruption relay 144, 146, 147 and passes the next transfer signal to place third stepping switch 163 in a ready state and thence to a detecting state, in a like manner. Third stepping switch 163 is thus activated to trip upon detection of the next consecutive strand interruption and count through three stages of operation to reject a third short casing to scrap.

If this occurs, first stepping switch 161 has by this time counted out the three stages of operation to complete the rejecting function, and is in turn, activated to a detecting stage to detect a 4th successive short stick. However, if first stepping switch 161 detects a short casing and shirring on that position is stopped while the machine continues to operate the other positions, second stepping switch 162 is not indexed to detecting state until shirring is resumed by energizing clutch 39. Thus if more than three cycles elapse before shirring starts, first stepping switch 161 again is ready to be activated to the detecting state.

When a shirring position is successively producing full length casing sticks, first stepping switch 161 only, is maintained in the detecting position indexed on cam 222. By virtue of the open circuit at cam 222 index, shaft 220 does not then ratchet at each transfer cycle until a strand interruption signal is received whereupon second stepping switch 162 is activated to the detecting position. Thus any combination of sequential strand interruptions is controlled by the memory unit comprised of switches 161, 162, 163, and each short length casing is rejected to scrap no matter in what sequence the short casing occur.

It will be obvious to those skilled in the art of shirring casing that the various types of shirring, compacting, severing, compressing and fault segregating means herein disclosed may be used in various combinations to provide a cooperatively operated multi-mandrel shirring apparatus that has a higher rate of production and requires less operator attendance than heretofore. And it will also be apparent that although the invention is described herein with specific reference to particular apparatus employing particular shirring heads and holdback mechanisms, the principles and advantages of the invention may be enjoyed with the use of other forms of shirring heads and holdbacks. And although particular reference is made to severing a first shirred portion of casing from unshirred casing supply (e.g. FIG. 10) the time and location of severing is immaterial as long as each shirred portion under goes three compression stages.

What is claimed is:

1. Apparatus for the manufacture of shirred casings comprising a shirring head, a fixed stationary mandrel, means for supplying a flexible tubing to said shirring mandrel, and means for operating said shirring head to shirr successive measured lengths of said tubing on the same mandrel, a holdback member reciprocally movable along said mandrel for a predetermined travel to restrain the advance of the tubing shirred by the shirring head as a first stage of compression of said tubing, a transfer member reciprocally movable along the mandrel and having pivotally attached thereto a transfer arm provided with a powered member for gripping and severing a shirred length of tubing, a first clamp positioned on the mandrel beyond the length of travel of the holdback member and supporting said mandrel, a second clamp positioned on the mandrel at a distance from the first clamp, said second clamp having opposite front and rear holding surfaces for the shirred tubing, the transfer member and the transfer arm adapted to advance the severed length of shirred tubing through the first clamp and against the front holding surface of the second clamp as a second stage of compression, and such that movement of the transfer member towards said second clamp actuates a reverse compressor member in engagement with the mandrel on the other side of said second clamp to advance against the opposite rear holding surface of said second clamp as a third stage of compression another length of shirred tubing previously compressed against the said front holding surface.

2. Apparatus as claimed in claim 1, in which the transfer member has a rod mounted thereon in spaced parallel relationship with the mandrel, the extremity of said rod supporting a shipper arm having a jaw for engaging the mandrel and rotatably attached to the rod, the shipper arm being adapted to engage the mandrel when the second clamp opens at a point between the two lengths of compressed shirred tubing, opening of said second clamp permitting further movement of the transfer member along the mandrel, the transfer arm adapted to advance one length of shirred tubing from one side to the other side of the second clamp while the shipper arm doffs the other compressed length of shirred tubing off the mandrel.

3. Apparatus as claimed in claim 1, which comprises a plurality of stationary hollow mandrels disposed in spaced parallel relationship with respect to each other, each of said mandrels extending through a shirring head and having a first clamp and a second clamp positioned thereon, the holdback member being a holdback carriage provided with a plurality of holdback arms pivotally mounted thereon, one for each mandrel and connected to each other, the transfer member being a transfer carriage having a plurality of transfer arms attached thereto, one for each mandrel and connected to each other, a plurality of reverse compressor members, one for each mandrel actuated by movement of the transfer carriage towards the second clamps and adapted to be released from engagement with the mandrels by opening of said second clamps.

4. Apparatus as claimed in claim 3, in which the transfer carriage has a plurality of rods and shipper arms attached thereto, one for each mandrel.

5. Apparatus as claimed in claim 1, having sensing means to sense discontinuities in tubing fed to the mandrel and means associated with said sensing means for automatically rejecting defective shirred lengths of tubing, said associated rejecting means comprising a memory unit including a plurality of cam stepping switches connected in cascade circuitry, each of said switches being independently actuated by said sensing means upon passage of a defective tubing length through the shirring head and adapted to count said tubing length through the three compression stages thereof and to thereafter activate a relay rejecting said tubing length.

6. Apparatus as claimed in claim 5, in which the means to sense discontinuities in the tubing fed to the mandrel comprises a lower and an upper sensing roller, said rollers having interfitting circumferential grooves and ridges on the surface thereof, upward or downward movement of said upper roller being in response to irregularities in the casing passing between said rollers and actuating the memory device.

7. Apparatus as claimed in claim 1, which comprises strand splicer means positioned between the shirring head and the means for supplying the tubing to the mandrel, said strand splicer means including a pair of clamp members adapted to clamp said tubing with a loop portion thereof containing a coupler depending freely from said members while adjacent portions of tubing fore and aft of said loop are brought into abutting relationship by said members for splicing.

References Cited

UNITED STATES PATENTS

| | | | |
|---|---|---|---|
| 2,983,949 | 5/1961 | Matecki | 17—42 |
| 3,110,058 | 11/1963 | Marbach | 17—42 |
| 3,112,517 | 12/1963 | Ives | 17—42 |
| 3,209,398 | 10/1965 | Ziolko | 17—42 |
| 3,315,300 | 4/1967 | Ziolko | 17—42 |

LUCIE H. LAUDENSLAGER, Primary Examiner

U.S. Cl. X.R.

17—45